US006806907B1

(12) United States Patent
Tamura

(10) Patent No.: US 6,806,907 B1
(45) Date of Patent: *Oct. 19, 2004

(54) IMAGE PICKUP APPARATUS HAVING EXPOSURE CONTROL

(75) Inventor: Kyoji Tamura, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/420,047

(22) Filed: Apr. 11, 1995

(30) Foreign Application Priority Data

Apr. 12, 1994 (JP) .............................................. 6-73646
Jun. 17, 1994 (JP) ............................................ 6-159395

(51) Int. Cl.[7] ........................ H04N 5/235; H04N 5/238; H04N 5/222

(52) U.S. Cl. .................... 348/362; 348/364; 348/333.01
(58) Field of Search ................................. 348/362, 364, 348/333, 363, 333.01, 333.03, 333.12

(56) References Cited

U.S. PATENT DOCUMENTS

| 5,287,187 A | | 2/1994 | Sato et al. ................... 348/595 |
| 5,541,655 A | * | 7/1996 | Kaneda ....................... 348/333 |
| 5,831,676 A | * | 11/1998 | Takahashi et al. .......... 348/362 |

* cited by examiner

Primary Examiner—Wendy R. Garber
Assistant Examiner—Luong T. Nguyen
(74) Attorney, Agent, or Firm—Fitzpatrick, Cella, Harper & Scinto

(57) ABSTRACT

An image pickup apparatus, which detects the visual axis, can set a photometry area on the basis of the viewpoint of an operator in the screen, can set a plurality of photographing modes, and changes the setting data of the photometry area based on the visual axis detection and control characteristics in accordance with the selected photographing mode.

11 Claims, 23 Drawing Sheets

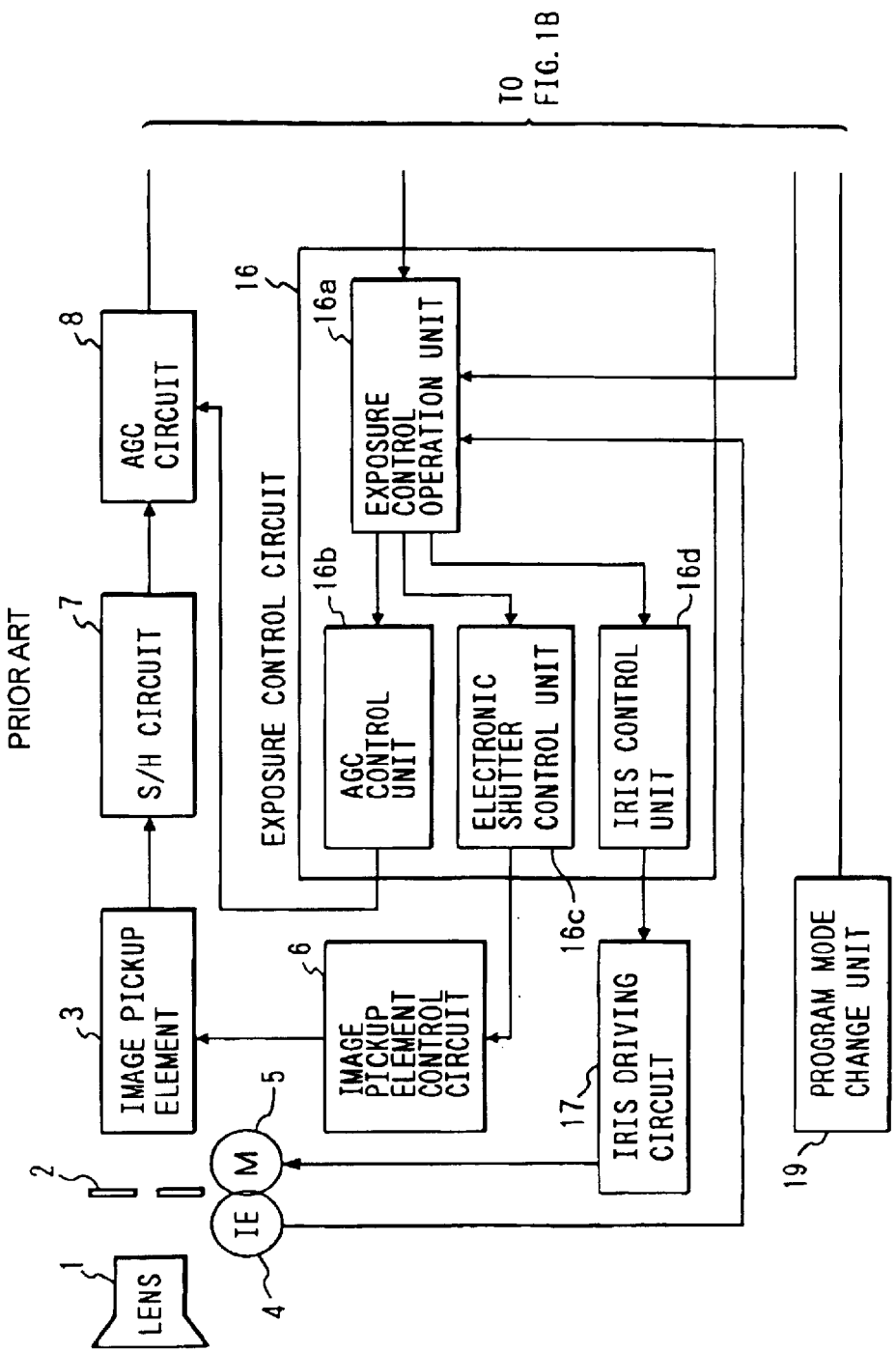

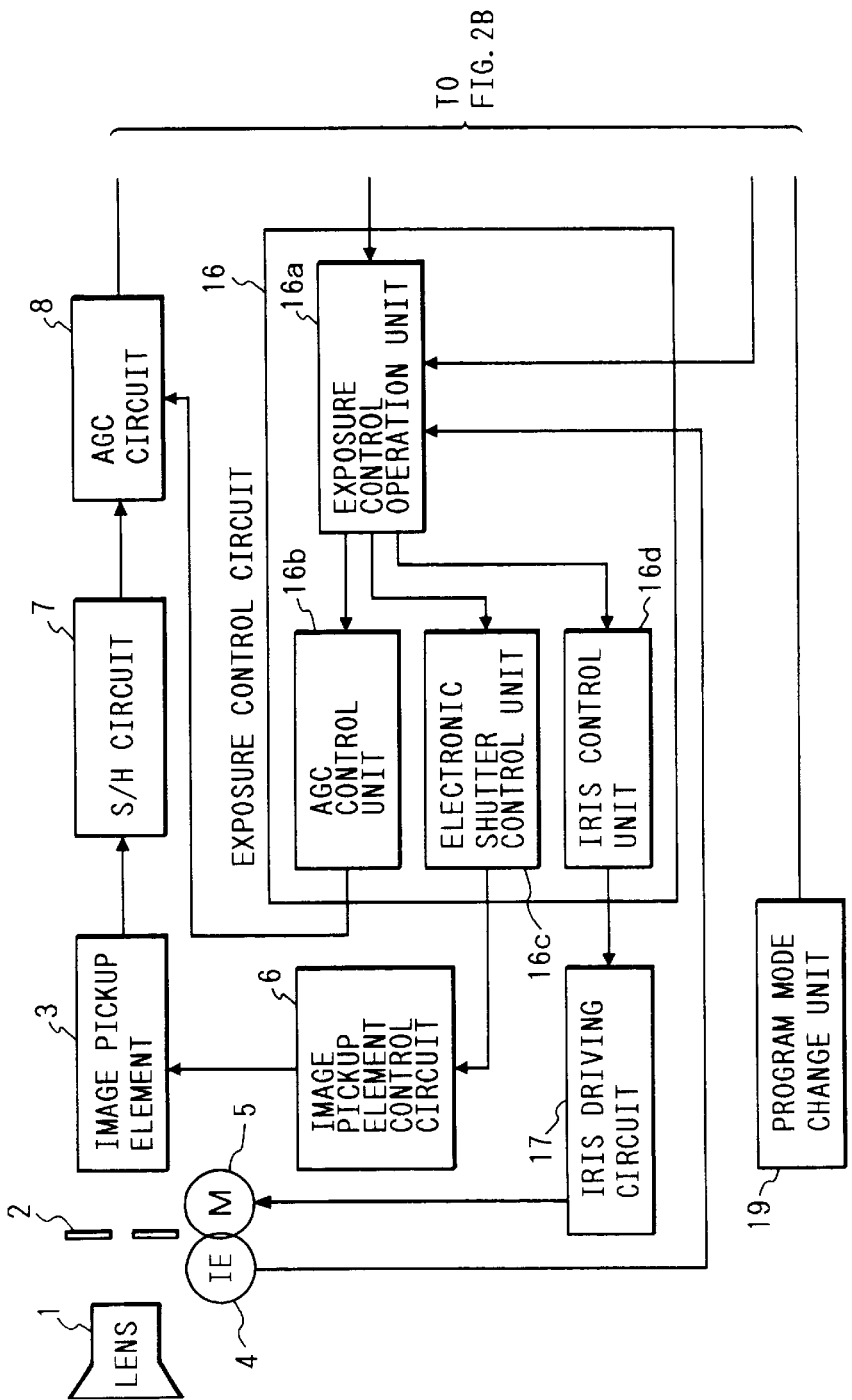

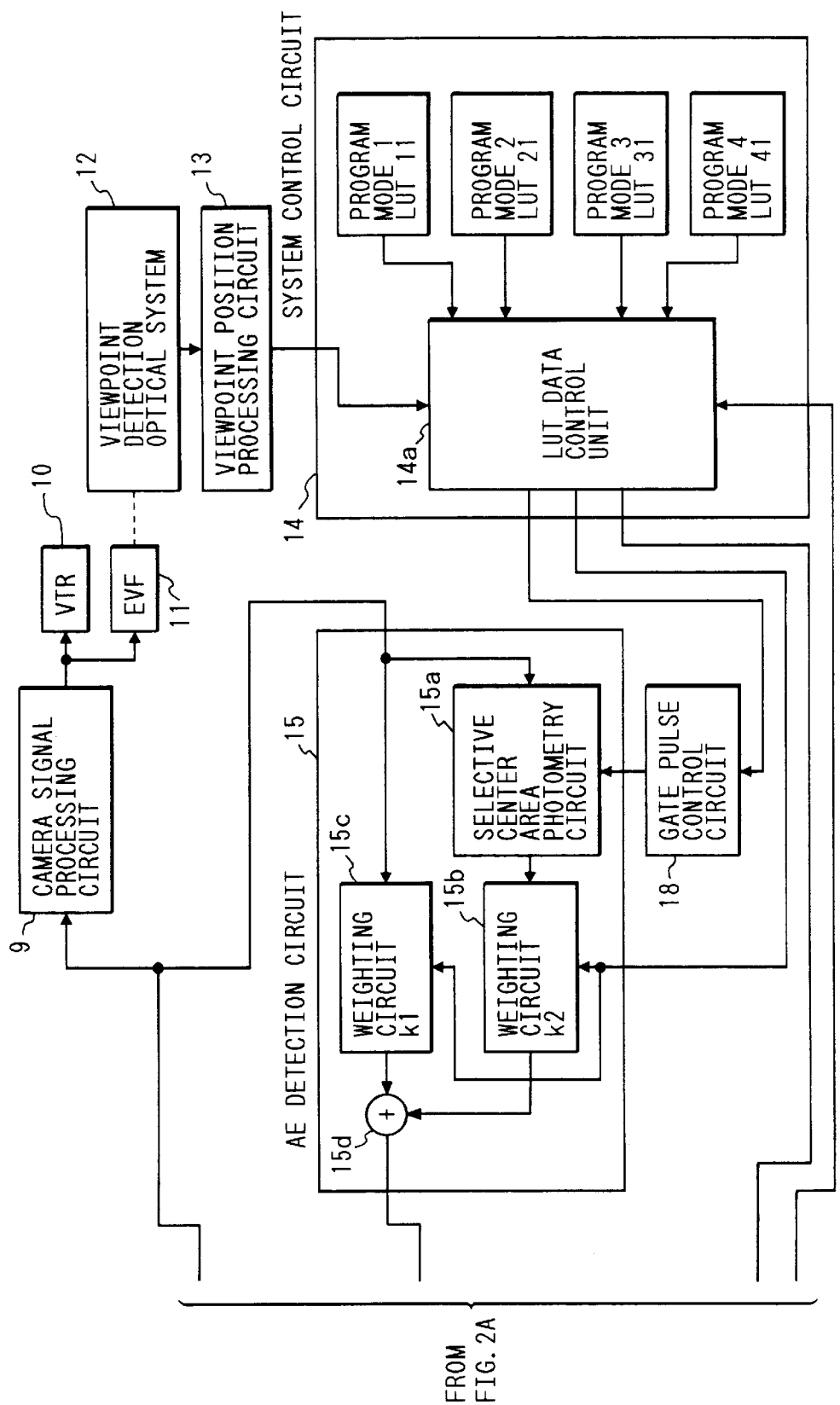

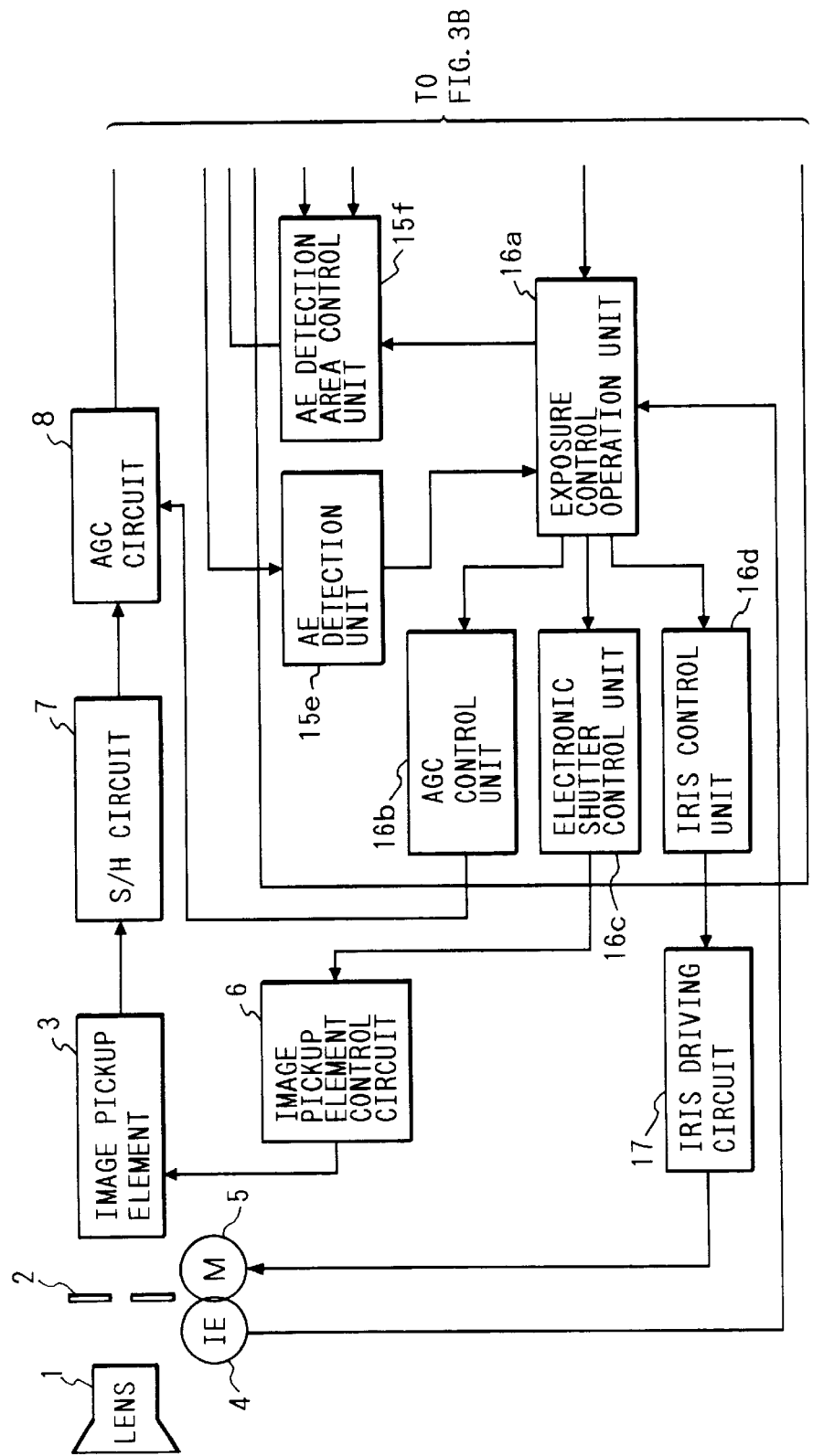

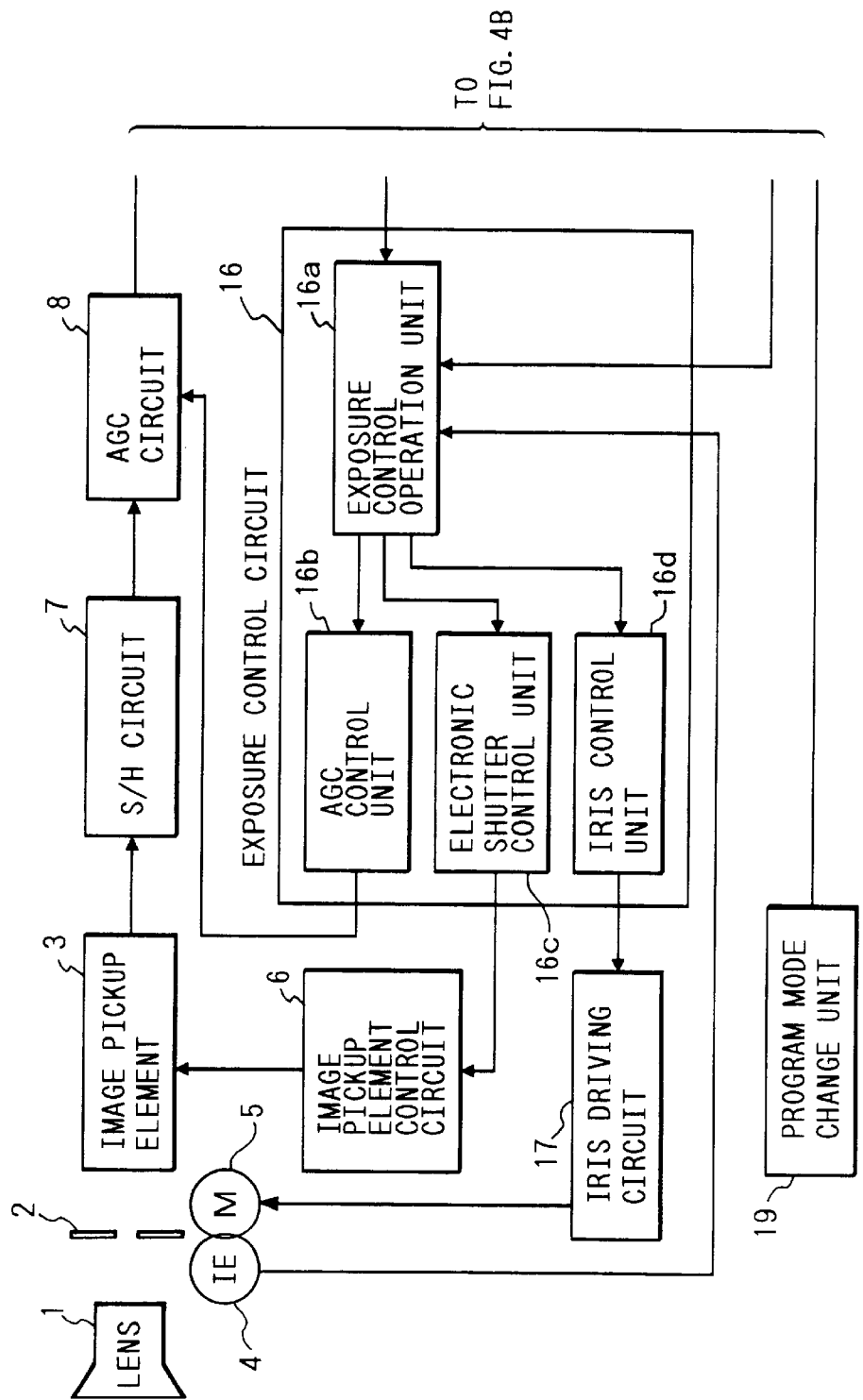

DIVISION AREA PHOTOMETRY

SELECTIVE CENTRAL AREA PHOTOMETRY

WHOLE AREA PHOTOMETRY

POSITION DETECTION INFORMATION TRACKING PHOTOMETRY

POSITION DETECTION INFORMATION TRACKING PHOTOMETRY

FIG. 10

| PARAMETER / MODE | (A) | | | (B) VIEWPOINT POSITION INFORMATION TRACKING PARAMETER | |
|---|---|---|---|---|---|
| | IRIS | AGC | ELECTRONIC SHUTTER | SIZE OF PHOTOMETRY AREA | TRACKING AREA |
| PROGRAM MODE 1 (LUT 1) | OPEN—CLOSE | 0dB—20dB | 1/60 SEC | MIDDLE | WHOLE AREA |
| PROGRAM MODE 2 (LUT 2) | OPEN—CLOSE | 0dB—20dB | 1/60 SEC—1/500 SEC | MIDDLE | LOWER AREA |
| PROGRAM MODE 3 (LUT 3) | OPEN | 0dB—20dB | 1/60 SEC—1/1000 SEC | LARGE | CENTRAL AREA |
| PROGRAM MODE 4 (LUT 4) | OPEN—CLOSE | 0dB | 1/60 SEC | SMALL | WHOLE AREA |

FIG. 11

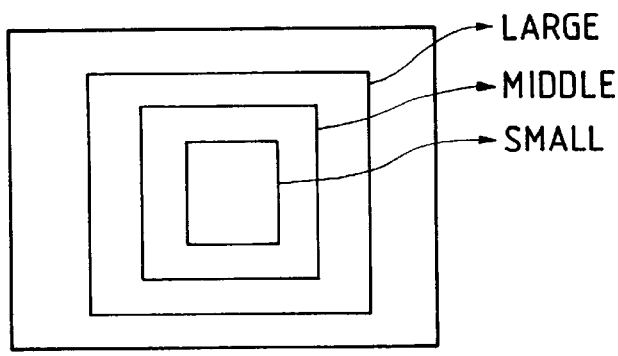

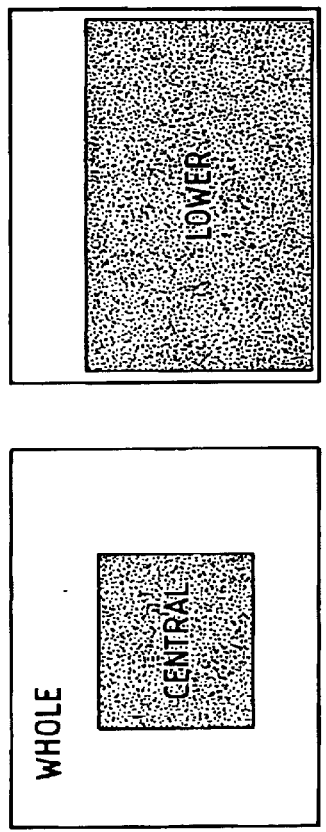
FIG. 12A
FIG. 12B
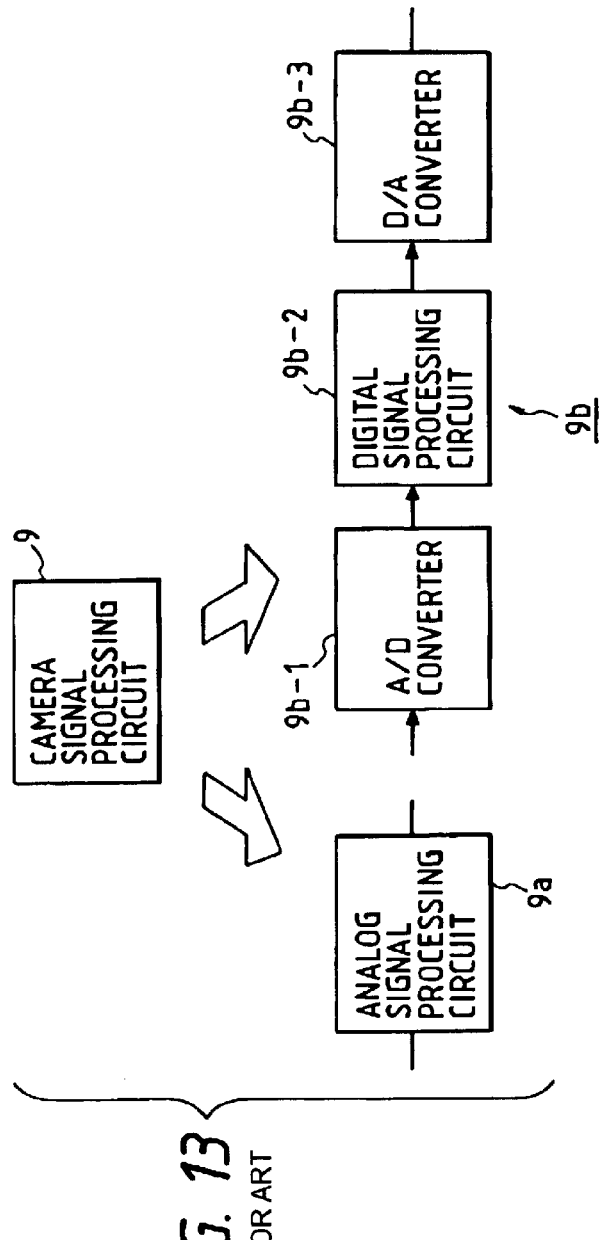
FIG. 13
PRIOR ART

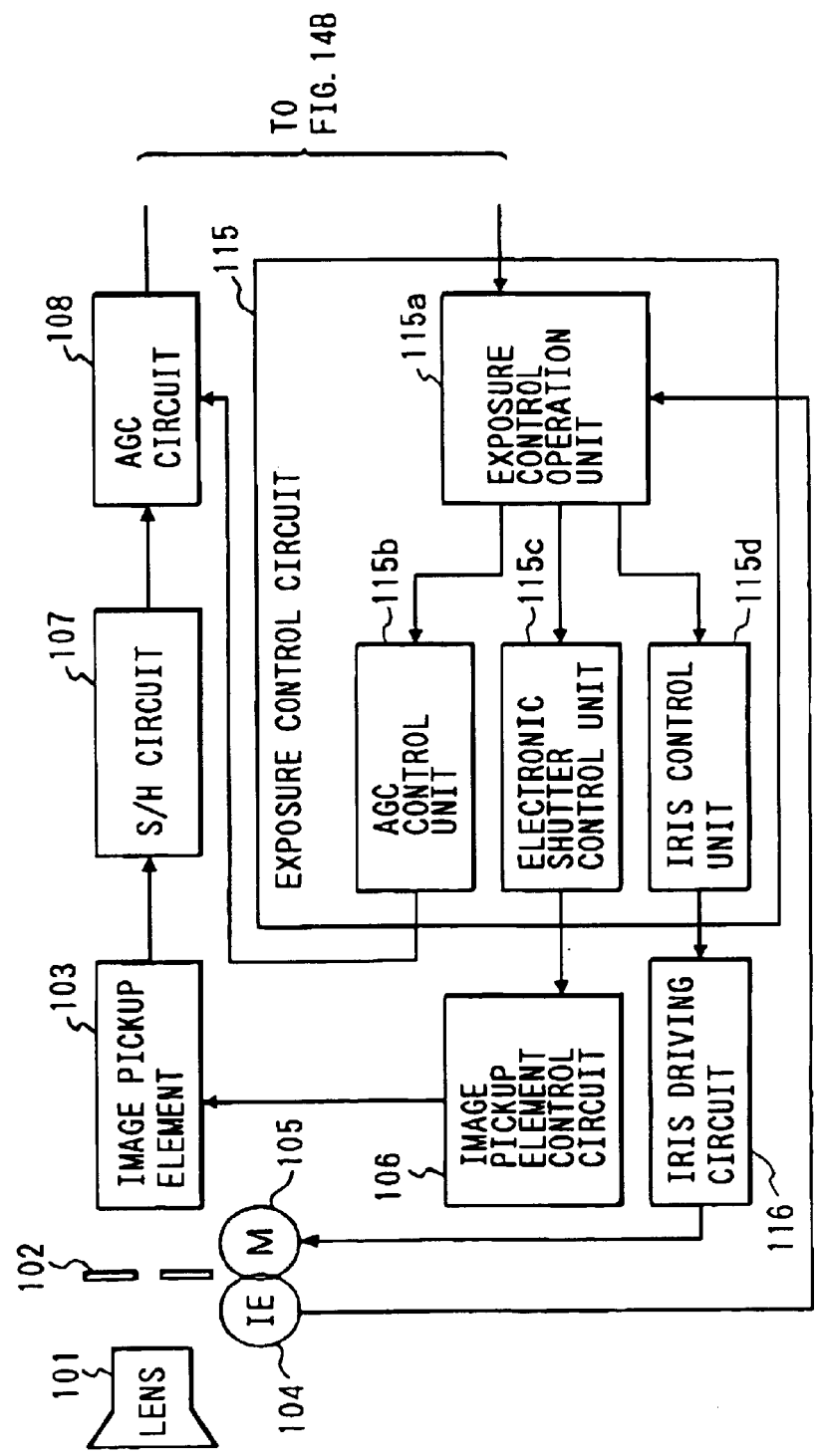

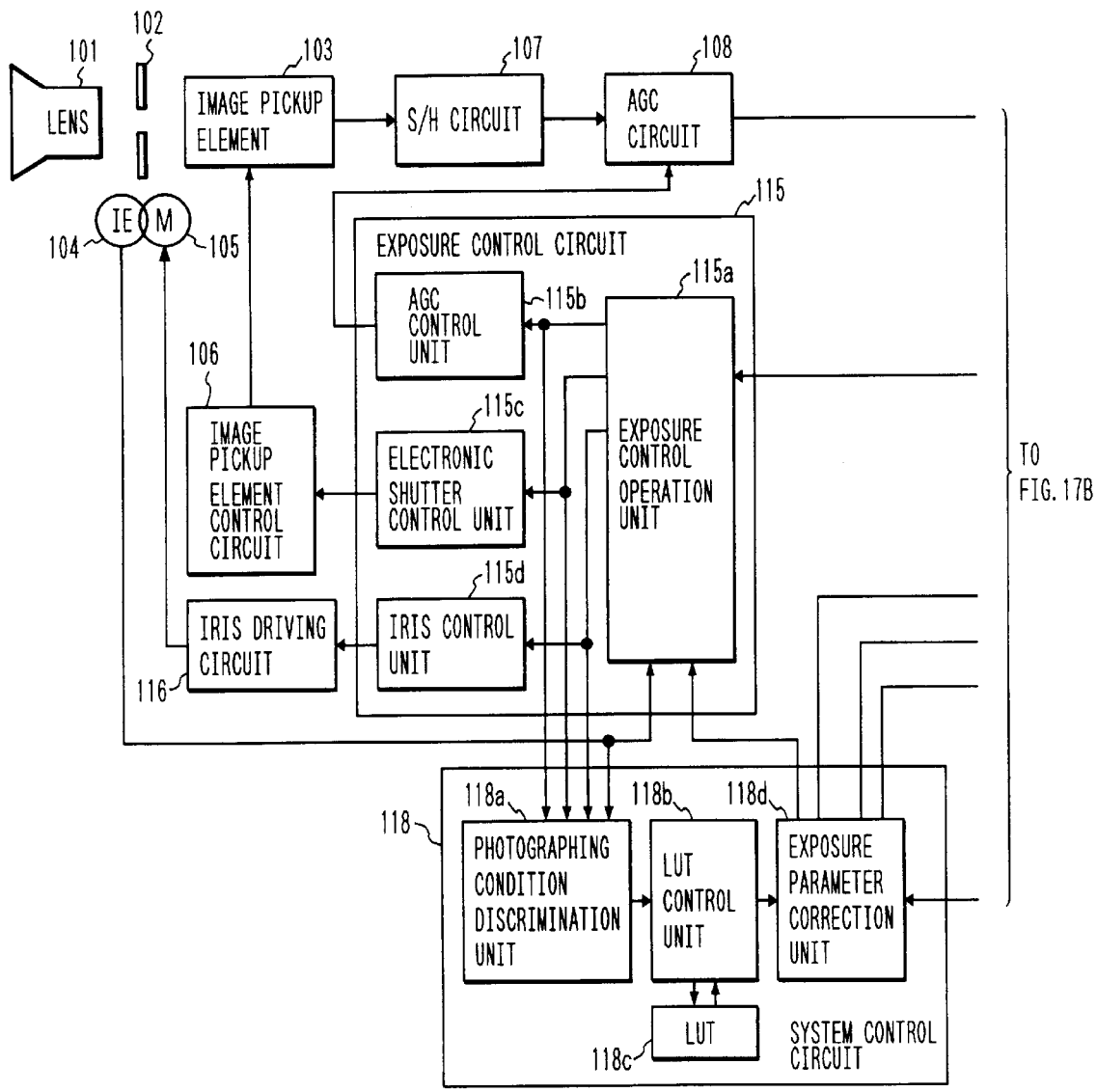

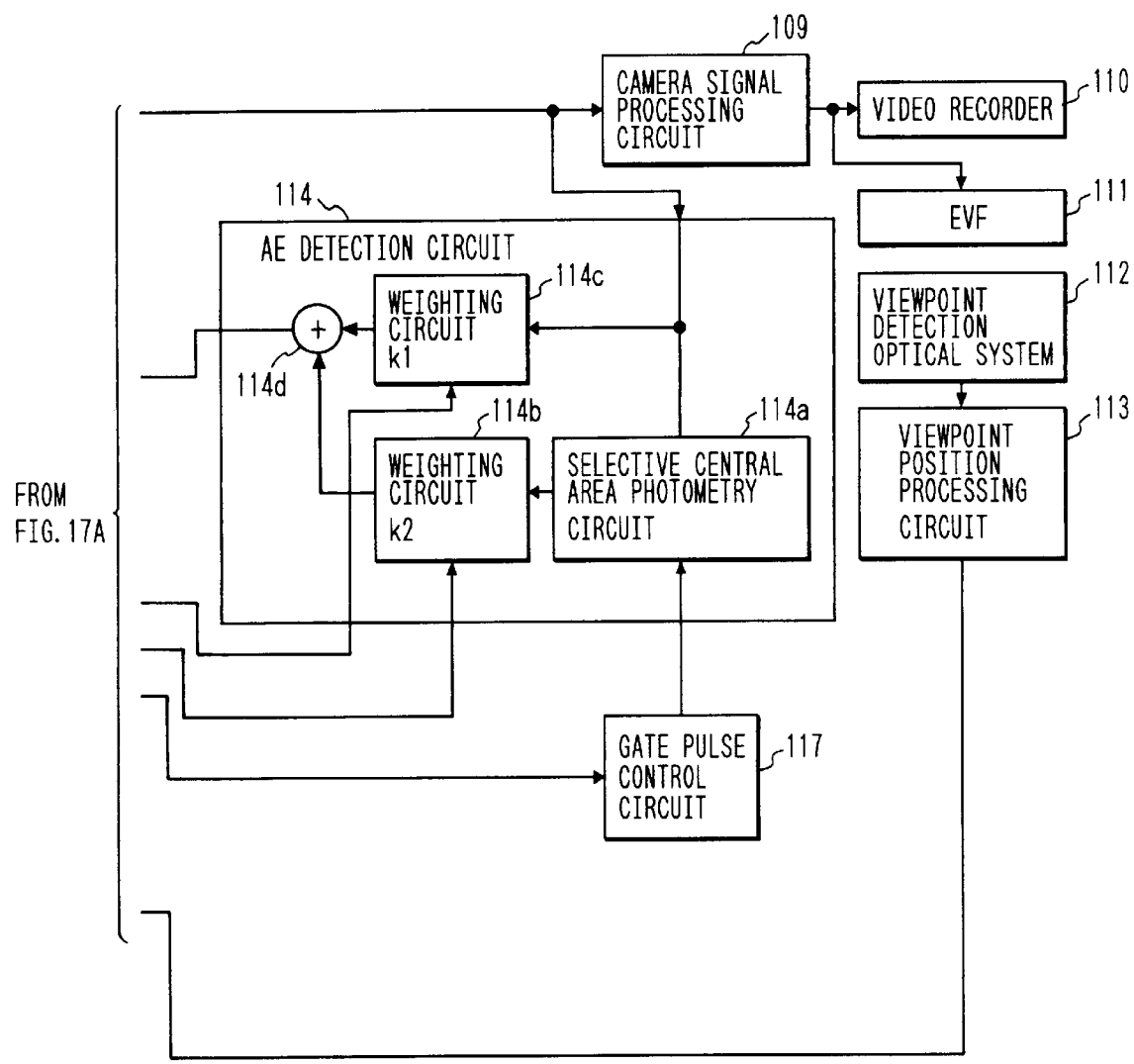

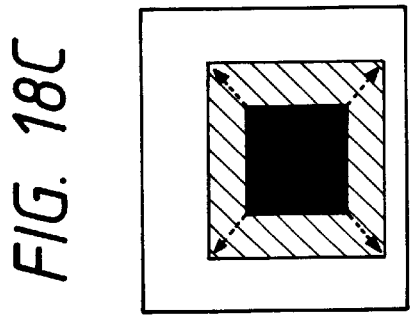
FIG. 18C
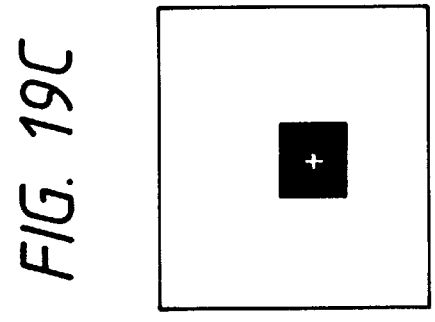
FIG. 19C
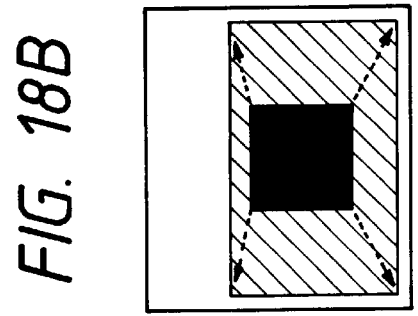
FIG. 18B
FIG. 19B
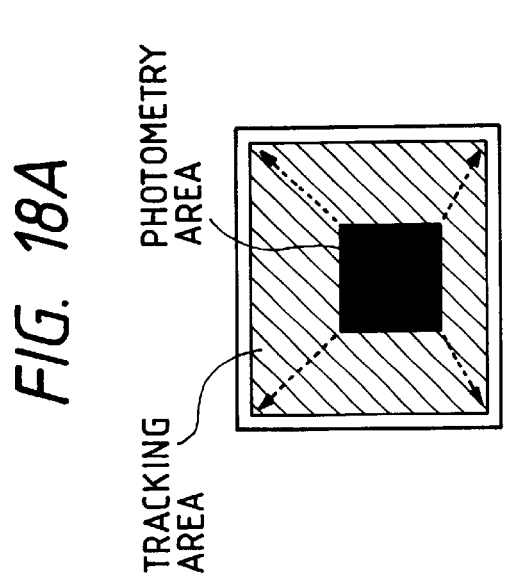
FIG. 18A
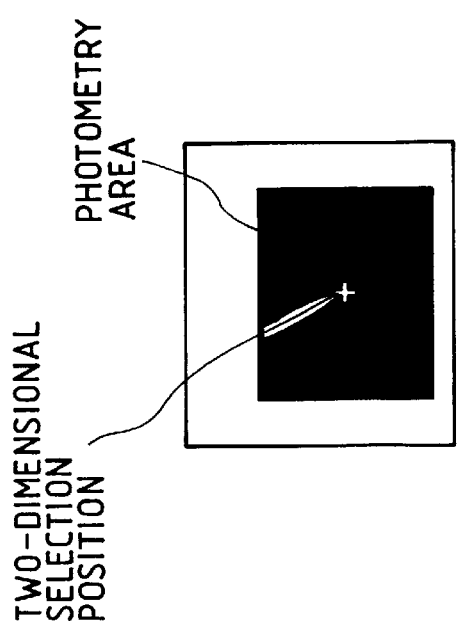
FIG. 19A

FIG. 20

| PARAMETER<br>PHOTOGRAPHING CONDITION | PHOTOMETRY AREA | TRACKING RANGE | TRACKING SPEED (RESPONSE) | WEIGHTING RATIO (VIEWPOINT PORTION : SURROUNDING PORTION) | EXPOSURE CONTROL PARAMETER |
|---|---|---|---|---|---|
| LUT 1 OUTDOOR ① (FRONT LIGHT) | LARGE (FIG. 19A) | MIDDLE, LOWER AREA (FIG. 18B) | NORMAL | 7 : 4 | IRIS AGC |
| LUT 2 OUTDOOR ② (BACKLIGHT) | NORMAL (FIG. 19B) | CENTRAL AREA (FIG. 18C) | SLOW | 8 : 2 | IRIS AGC |
| LUT 3 OUTDOOR ③ (HIGH BRIGHTNESS) | LARGE (FIG. 19A) | CENTRAL AREA (FIG. 18C) | SLOW | 6 : 4 | IRIS ELECTRONIC SHUTTER |
| LUT 4 INDOOR ① (NORMAL ILLUMINANCE) | NORMAL (FIG. 19B) | WHOLE AREA (FIG. 18A) | FAST | 7 : 3 | IRIS AGC |
| LUT 5 INDOOR ② (LOW ILLUMINANCE) | NORMAL (FIG. 19B) | WHOLE AREA (FIG. 18A) | FAST | 5 : 5 | AGC |
| LUT 6 INDOOR ③ (SPOTLIGHT) | SMALL (FIG. 19C) | WHOLE AREA (FIG. 18A) | NORMAL | 9 : 1 | IRIS AGC |

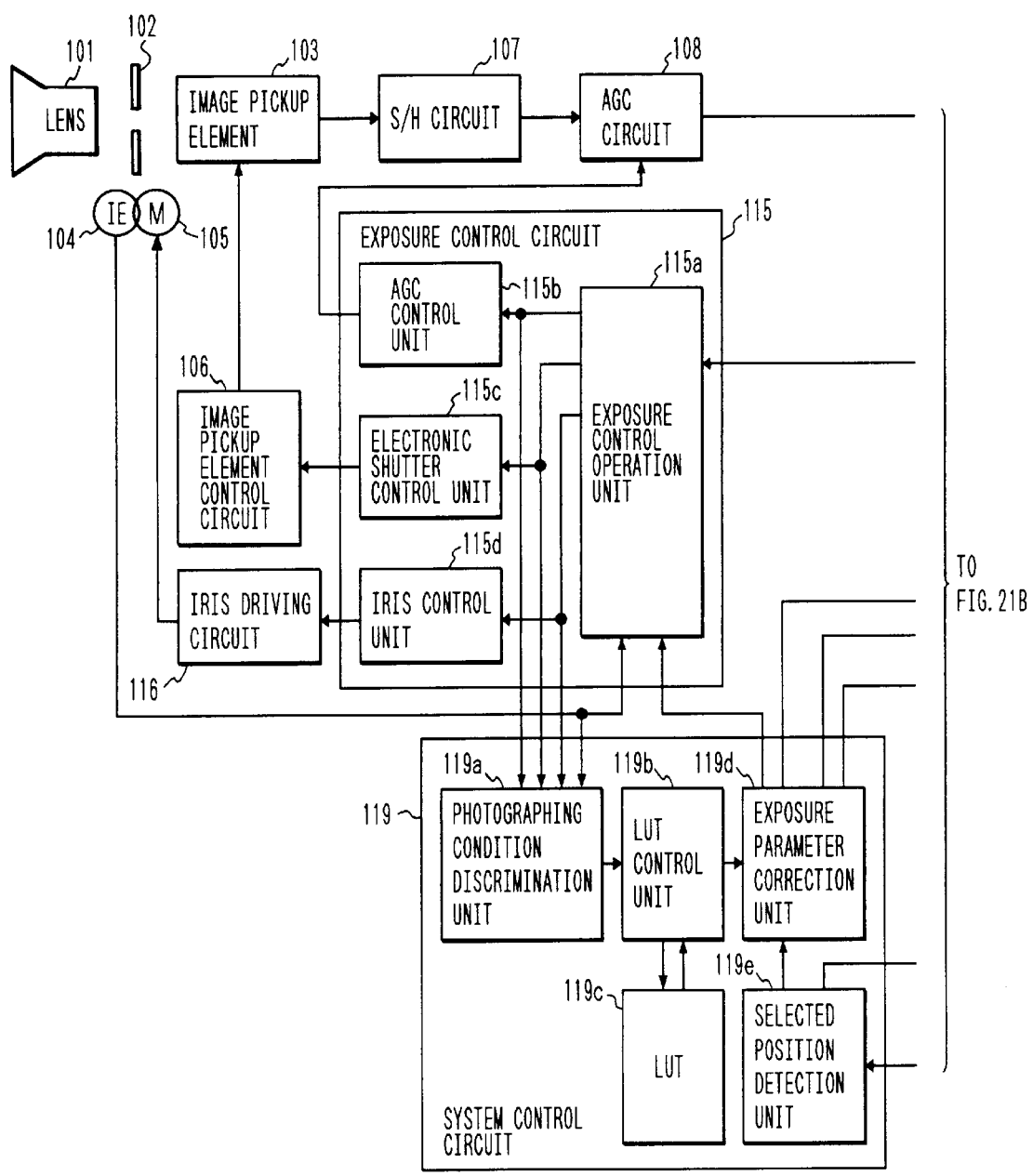

IMAGE PICKUP APPARATUS HAVING EXPOSURE CONTROL

BACKGROUND OF THE INVENTION

1. Field of the Invention

The present invention relates to an image pickup apparatus and, more particularly, to an exposure control apparatus.

2. Related Background Art

FIGS. 1A and 1B are block diagrams showing the arrangement of a conventional image pickup apparatus. Referring to FIGS. 1A and 1B, the image pickup apparatus comprises an imaging lens group 1 for an object image, an aperture mechanism 2 such as an iris for controlling the incident light amount, an image pickup element 3 for photoelectrically converting incident light, an iris detection unit 4 comprising, e.g., a Hall element for detecting the state of the aperture mechanism 2, a driving motor 5 such as an IG meter for driving the aperture mechanism 2, an image pickup element control circuit 6 which controls the image pickup element 3 to read out a photoelectrically converted signal, and controls the signal accumulation time, i.e., controls a so-called electronic shutter function, a sample & hold (S/H) circuit 7 for sampling a signal photoelectrically converted by the image pickup element 3, an auto-gain control circuit (to be referred to as an AGC circuit hereinafter) 8 for electrically amplifying a signal, and a camera signal processing circuit 9 for performing processing of a signal such as gamma correction, color separation, color difference matrix, and the like, and thereafter, adding a synchronization signal to the processed signal to generate a standard TV signal. As the camera signal processing circuit 9, as shown in FIG. 13, an analog signal processing circuit 9a for performing processing in an analog signal state, or a digital signal processing circuit 9b for analog-to-digital converting a video signal, performing processing in a digital signal state, and thereafter digital-to-analog converting the processed signal is available. In this case, the analog signal processing circuit 9a is used.

The apparatus also comprises a video tape recorder (to be referred to as a VTR hereinafter) 10 for recording a video signal from the camera signal processing circuit 9 on a magnetic tape, an electronic viewfinder 11 for monitoring the video signal, an AE detection circuit 15 for gating an output signal from the AGC circuit 8 as needed, and performing photometry for exposure control, such as selective central area photometry, an exposure control circuit 16 for controlling the shutter speed of the electronic shutter controlled by the image pickup element control circuit 6, the gain of the AGC circuit 8, and the like, an iris driving circuit 17 for driving the aperture mechanism 2 in accordance with an output from the exposure control circuit 16, a gate pulse control circuit 18 for generating gate pulses used for gating an image area required for detection in the AE detection circuit 15, a program mode change unit 19 for selecting a program mode, and a system control circuit 24 for controlling the program mode.

The AE detection circuit 15 comprises a selective central area photometry circuit 15a, weighting circuits 15b and 15c, and an adder 15d. The exposure control circuit 16 comprises an exposure control operation unit 16a, an AGC control unit 16b, an electronic shutter control unit 16c, and an iris control unit 16d. The system control circuit 24 comprises look-up tables (LUTs) 12, 22, 32, and 42 corresponding to program modes 1 to 4, and an LUT data control unit 24a. Note that the AE detection circuit 15 and the exposure control circuit 16 constitute exposure control means.

The image pickup apparatus with the above-mentioned arrangement realizes photographing control system called a "program mode" which sets a mode for selecting a plurality of control parameters such as exposure control parameters, white balance control parameters, gamma correction, aperture correction, and color suppression correction parameters as camera signal processing parameters, and the like under conditions optimal for the respective photographing conditions, under some typical photographing conditions, so as to allow optimal photographing operations in various places and various conditions.

An example of a program mode that places an importance on exposure control will be described below.

Control parameters for determining exposure include the aperture mechanism, AGC, electronic shutter, and the like, and the system control circuit 24 stores data, which are set in correspondence with objects and photographing conditions in units of program mode, in the form of LUTs, i.e., the LUT 12 corresponding to program mode 1, the LUT 22 corresponding to program mode 2, the LUT 32 corresponding to program mode 3, and the LUT 42 corresponding to program mode 4. The system control circuit 24 reads out data of an LUT corresponding to the program mode set by the program mode switch unit 19, and controls the respective parameters on the basis of the readout data, thus realizing the program mode.

For example, when the motion of an object is fast, the electronic shutter for controlling the accumulation time of the image pickup element 3 is preferentially set at high speeds, thus achieving a so-called "sport mode" which allows a photographing operation with a good dynamic resolution. On the other hand, when the aperture mechanism is preferentially set at the full-open side, and exposure control is performed based on other parameters, a so-called "portrait mode" which can provide an effect of blurring the background image due to a small field depth, and is suitable for a photographing operation of a person is achieved. In this manner, photographing operations optimal for photographing conditions can be realized.

Furthermore, the AE detection circuit 15 controls the photometry distribution on the basis of the photometry area and detection position of a video signal for exposure control, which are set by the gate pulse control circuit 18, thus realizing an optimal photographing operation. For example, the AE detection circuit 15 can realize so-called average photometry which detects a whole image area, and performs exposure control, so that the detection signal from the whole image area has a predetermined level, as shown in FIG. 5A. Also, the AE detection circuit 15 realizes selective central area photometry which detects only a central portion of the image area, and performs exposure control, so that the detection signal from the image area has a predetermined level, as shown in FIG. 5B.

When the AE detection circuit 15 performs exposure control on the basis of detection data obtained by weighting detection data from the whole image area and the selective central area in the weighting circuits 15b and 15c, and adding the weighted data by the adder 15d at a predetermined ratio, exposure control based on a photometry method as a combination of the average photometry and selective central area photometry can be realized. By changing the weighting coefficients in correspondence with an object and a photographing condition in each program mode, optimal exposure control that can effectively utilize the merits of the respective photometry methods can be realized. For example, when a main object is illuminated with spot light, and its background portion is dark, or when a main object is irradiated with back light, the weighting coefficient of the selective central area photometry is increased. On the other hand, when a proper exposure state is to be attained not only for a main object but also for a background object with a good balance, the weighting coefficient of the average photometry is increased.

Also, as shown in FIG. 5C, the frame is divided into division areas, image detection is performed in units of division areas, and the areas of detection data used in exposure control are limited or the weighting coefficient is changed in correspondence with an object or a photographing condition in each program mode, thus allowing flexible exposure control.

However, even in the exposure control based on the program mode, exposure control, which places an importance on the signal detection result obtained by detecting the brightness of a central portion under the assumption that a target object is present at the central portion of an image, is normally performed. For this reason, the signal detection area is fixed at the central portion, and when a target object of a photographer is offset from the central portion, optimal exposure control for the object cannot be attained.

SUMMARY OF THE INVENTION

The present invention has been made to solve the above-mentioned problems, and has as its first object to provide an image pickup apparatus which can perform proper exposure control with respect to a target object of a photographer.

In order to achieve the above object, according to a preferred aspect of the present invention, there is disclosed an image pickup apparatus comprising two-dimensional position selection means for selecting at least a portion of a video signal obtained from an image pickup element, exposure control means for controlling an exposure state of the video signal, and program mode control means, having a plurality of program modes which can be selected in accordance with a photographing condition and are respectively set with control parameters for controlling the exposure state, for outputting a control signal for controlling a position of a photometry area to be subjected to exposure in accordance with position information obtained from the two-dimensional position selection means, and supplying the control parameters set in the selected program mode and the control signal to the exposure control means.

According to another preferred aspect of the present invention, there is disclosed an image pickup apparatus, wherein the program mode control means can set the plurality of program modes for optimizing a camera signal processing state such as gamma correction, aperture correction, and the like, a white-balance state, a focusing state, and the like in addition to the exposure state by controlling one or a plurality of control parameters under a condition optimal for a photographing condition under one or a plurality of typical photographing conditions, and causes the exposure control means to perform optimal exposure control corresponding to the selected program mode.

According to still another preferred aspect of the present invention, input means such as a joystick, track ball, mouse, touch panel, or the like is used as the two-dimensional position selection means.

According to still another preferred aspect of the present invention, the control parameters include a parameter for controlling a size of the photometry area.

According to still another preferred aspect of the present invention, the control parameters include a parameter for controlling a moving range of the photometry area.

According to still another preferred aspect of the present invention, the control parameters include a parameter for controlling a moving range of the photometry area and limiting movement of the photometry area to an upper portion of an image pickup surface of the image pickup element.

It is the second object of the present invention to allow the photometry area in a frame to be movable, and to optimize the exposure control of the photometry area in correspondence with the photographing mode.

In order to achieve the above object, according to still another preferred aspect of the present invention, there is disclosed an image pickup apparatus further comprising means for setting an image detection area in first detection means for detecting the exposure state of the image area corresponding to the position selected by the two-dimensional position selection means, and setting a range for tracking the image detection area with respect to the selected position as control parameters associated with exposure control which is performed to track the detection signal of the image area corresponding to the position selected by the two-dimensional position selection means, second detection means for detecting an exposure state of an image area different from the first detection means for detecting the exposure state of the image area corresponding to the position selected by the two-dimensional position selection means at one or a plurality of positions, an d weighting mean s for multiplying detection signals from the first and second detection means with predetermined weighting coefficients, and wherein the program mode control means changes setting data of the detection area of the second detection means, setting data of the weighting coefficients to be multiplied with the detection signals of the first and second detection means by the weighting means, selecting data of exposure control parameters such as an aperture mechanism, auto-gain control, electronic shutter, and the like in the exposure control means, and setting data of response characteristics of exposure control, in correspondence with the program mode.

According to still another preferred aspect of the present invention, there is disclosed an image pickup apparatus an image pickup element having a photoelectric conversion function, an electronic viewfinder for displaying a video signal obtained from the image pickup element, viewpoint position detection means for detecting a position of a viewpoint of a photographer on a screen of the electronic viewfinder, exposure control means for controlling an exposure state of the video signal, and program mode control means, having a plurality of program modes which can be selected in accordance with a photographing condition and are respectively set with control parameters for controlling the exposure state, for outputting a control signal for controlling a position of a photometry area to be subjected to exposure in accordance with position information obtained from the viewpoint position detection means, and supplying the control parameters set in the selected program mode and the control signal to the exposure control means.

According to still another preferred aspect of the present invention, there is disclosed an image pickup apparatus further comprising means for setting an image detection area in first detection means for detecting the exposure state of the image area corresponding to the position detected by the viewpoint position detection means, and setting a range for tracking the image detection area with respect to the selected position as control parameters associated with exposure control which is performed to track the detection signal of the image area corresponding to the position detected by the viewpoint position detection means, second detection means for detecting an exposure state of an image area different from the first detection means for detecting the exposure state of the image area corresponding to the position detected by the viewpoint position detection means at one or a plurality of positions, and weighting means for multiplying detection signals from the first and second detection means with predetermined weighting coefficients, and wherein the program mode control means changes setting data of the detection area of the second detection means, setting data of the weighting coefficients to be multiplied with the detection signals of the first and second detection means by the weighting means, selecting data of exposure control parameters such as an aperture mechanism, auto-gain control, electronic shutter, and the like in the exposure control means, and setting data of response characteristics of exposure control, in correspondence with the program mode.

With the above-mentioned arrangement, since photometry is performed for the position of a main object selected by a photographer, and exposure is performed in correspondence with the photometry result, the main object can be optimally exposed without being influenced by light from a portion other than the main object. Upon combination with program mode control, an optimal image can be obtained in correspondence with an object and a photographing condition.

With the above-mentioned arrangement, when a photographer looks into the electronic viewfinder and watches a main object, photometry can be automatically performed for the position of the main object, and exposure is performed in correspondence with the photometry result. Therefore, the main object can be optimally exposed without being influenced by light from a portion other than the main object. Upon combination with program mode control, an optimal image can be obtained in correspondence with an object and a photographing condition.

Other objects and features of the present invention will become apparent from the following description of the specification taken in conjunction with the accompanying drawings.

BRIEF DESCRIPTION OF THE DRAWINGS

FIG. 2 which is composed of FIGS. 2A and 2B is a block diagram showing the arrangement according to the first embodiment of the present invention;

FIG. 10 is a table showing the data format of a look-up table;

FIG. 11 is a view for explaining the sizes to be set of a photometry area;

FIGS. 12A and 12B are views for explaining the tracking area to be set of a photometry area;

FIG. 13 is a diagram showing the types of camera signal processing circuits;

FIG. 17 which is composed of FIGS. 17A and 17B is a block diagram showing the arrangement of an image pickup apparatus according to the fourth embodiment of the present invention;

FIGS. 18A to 18C are views showing the tracking areas of photometry areas with respect to the viewpoint position of a photographer in the image pickup apparatus shown in FIGS. 17A and 17B;

FIGS. 19A to 19C are views showing areas to be preponderantly subjected to photometry with respect to the viewpoint position of a photographer in the image pickup apparatus shown in FIGS. 17A and 17B;

FIG. 20 is a table showing the description contents of an LUT used in the image pickup apparatus shown in FIGS. 17A and 17B.

DETAILED DESCRIPTION OF THE PREFERRED EMBODIMENTS

The preferred embodiments of an image pickup apparatus according to the present invention will be described in detail hereinafter with reference to the accompanying drawings.

The first embodiment of the present invention will be described below with reference to the accompanying drawings.

In the first embodiment of the present invention, an image pickup apparatus comprises an electronic viewfinder for monitoring as a two-dimensional position selection means, uses a viewpoint position detection means for detecting the viewpoint position of a photographer on the screen of the electronic viewfinder, and performs exposure control to track a detection signal of the viewpoint position detection means, i.e., viewpoint position information as the position of a main object where the photographer gazes.

Prior to the description of the first embodiment, an example of the viewpoint position detection method will be explained below.

Figure 6:
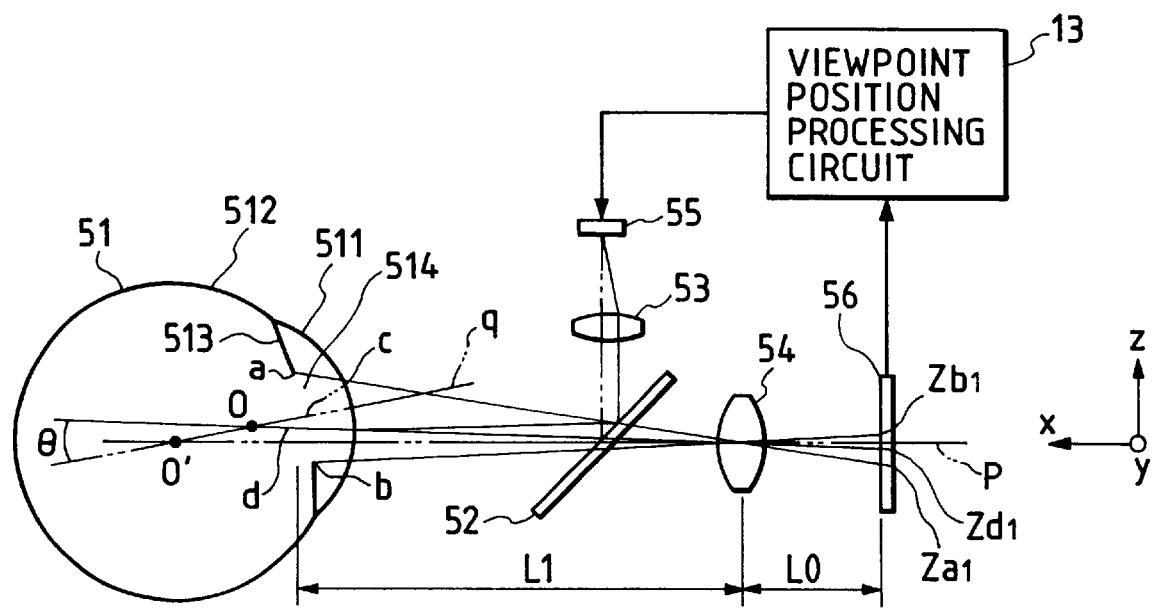
FIG. 6 is a schematic diagram showing the arrangement of a viewpoint detection optical system.
Figure 7:
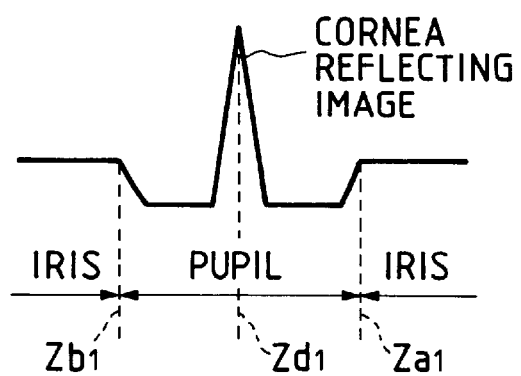
FIG. 7 is a graph showing the strength of an output signal from a photoelectric element array.

In this detection method, a collimated light beam emitted by a light source is irradiated onto the front eye portion of an eyeball of an observer, and a visual axis is calculated by utilizing a cornea reflecting image formed by light reflected by a cornea, and the focusing position of a pupil image. FIGS. 6 and 7 are explanatory views of the principle of the viewpoint position detection method, in which FIG. 6 is a schematic diagram of a viewpoint position detection optical system, and FIG. 7 is a graph showing the strength of an output signal from a photoelectric element array 56 shown in FIG. 6. Referring to FIG. 6, a light source 55 comprises, e.g., a light-emitting diode for irradiating infrared light to which an observer is insensitive. The light source 55 is arranged on the focal plane of a projection lens 53, and is driven by a viewpoint position processing circuit 13.

Infrared light emitted by the light source 55 is collimated by the projection lens 53, is reflected by a half mirror 52, and illuminates a cornea 511 of an eyeball 51. Images of end portions a and b of a cornea reflecting image d formed by some light components of the infrared light reflected by the surface of the cornea 511 are respectively formed at positions $Za_1$ and $Zb_1$ on the photoelectric element array 56 via the half mirror 52 and a light-receiving lens 54. When a rotation angle θ of an optical axis q of the eyeball with respect to the optical axis (p) of the light-receiving lens 54 is small, if the z-coordinates of end portions a and b of an iris 513 are represented by Za and Zb, a coordinate Zc of a central position c of the iris 513 is given by:

$$Zc=(Za+Zb)/2 \quad (1)$$

On the other hand, if the z-coordinate of a generating position d of the cornea reflecting image is represented by Zd and the distance from a center O of radius of the cornea 511 to the center c of the iris 513 is represented by OC, the rotation angle θ of the eyeball optical axis q substantially satisfies:

$$OC \times \sin θ = Zc-Zd \quad (2)$$

The z-coordinate Zd of the position d of the cornea reflecting image coincides with the z-coordinate Z of the center O of radius of the cornea 511. For this reason, when the viewpoint position processing circuit 13 detects the positions of specific points (the cornea reflecting image d and the end portions a and b of the iris 513) projected onto the surface of the photoelectric element array 56, the rotation angle θ of the eyeball optical axis q can be obtained. At this time, formula (1) is rewritten as:

$$β \times OC \times \sin θ = (Za_1+Zb_1)/2-Zd_1 \quad (3)$$

where β is the magnification determined by a distance L1 between the generating position d of the cornea reflecting image and the light-receiving lens 54, and a distance L0 between the light-receiving lens 54 and the photoelectric element array 56, and normally assumes an almost constant value.

Figure 8:
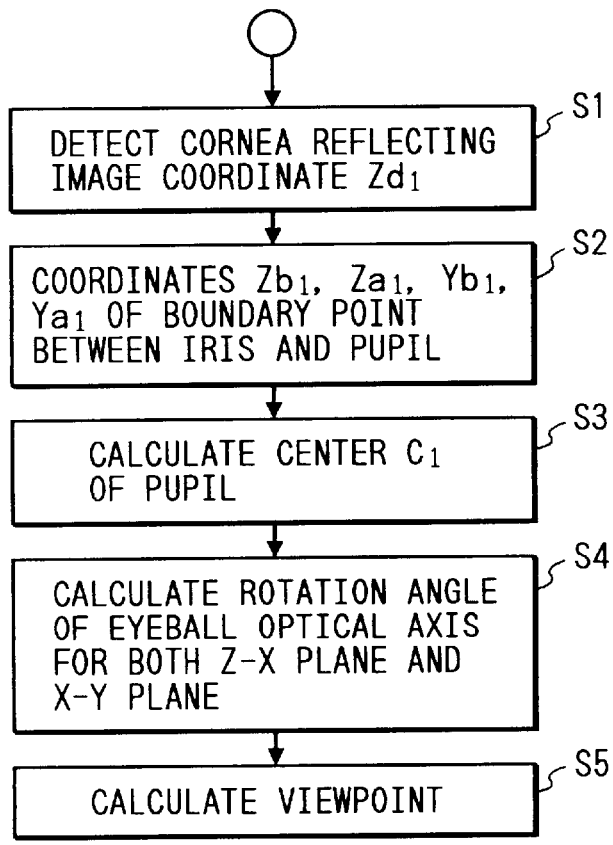
FIG. 8 is a flow chart showing a viewpoint calculation method.
Figure 9:
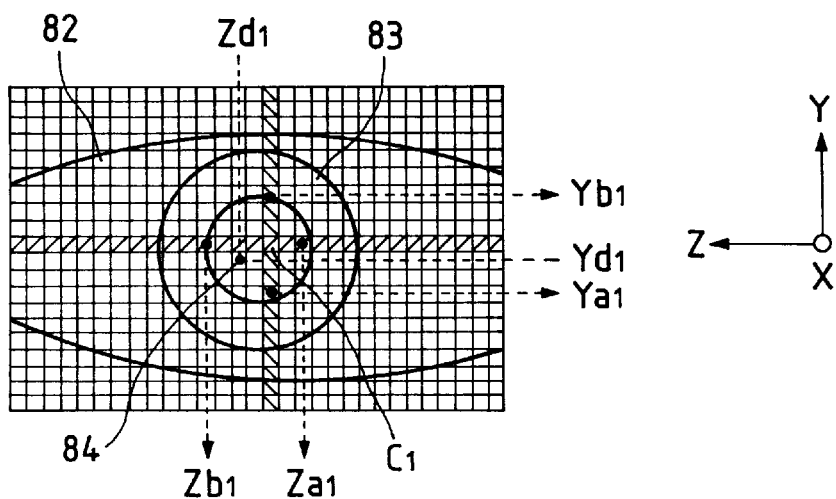
FIG. 9 is a view showing an eyeball reflecting image on the surface of the photoelectric element array.

The viewpoint calculation method will be explained below. FIG. 8 is a flow chart showing the viewpoint calculation method, and FIG. 9 shows the eyeball reflecting image on the photoelectric element array. In FIG. 9, $Za_1$, $Zb_1$, and $Zd_1$ are as described above, $C_1$ represents the central position of a pupil, $Yb_1$ and $Ya_1$ represent the upper and lower end coordinates on a pupil circle, and $Yd_1$ represents the y-coordinate of the cornea reflecting image.

Referring to FIG. 8, the coordinate $Zd_1$ of the cornea reflecting image in FIG. 9 is detected (see step S1). Then, the coordinates $Zb_1$, $Za_1$, $Yb_1$, and $Ya_1$ of boundary points between the iris and pupil are detected (step S2). Base on the data detected in step S2, the center $C_1$ of the pupil is calculated (step S3). Based on the above-mentioned data, the rotation angle of the eyeball is calculated (step S4). In this case, two different angles, i.e., an angle in the Z-X plane (horizontal direction) and an angle in the X-Y plane (vertical direction), are calculated. A viewpoint is calculated based on the calculated rotation angles θ (step S5).

The arrangement of the first embodiment of the present invention, in which the viewpoint position detection means is arranged in an electronic viewfinder 11 for monitoring, will be described below with reference to FIGS. 2A and 2B.

Figure 1B:
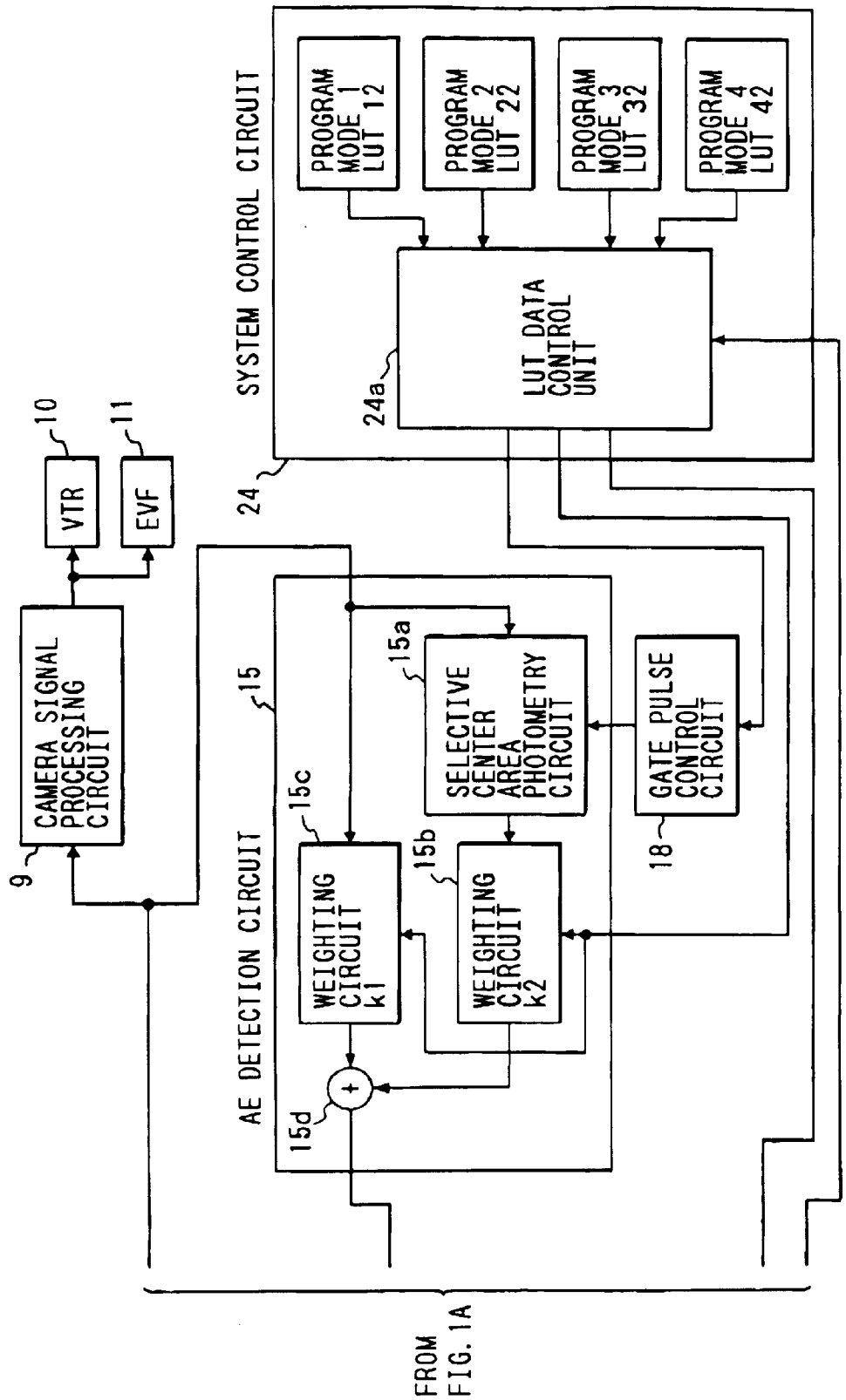
FIG. 1 which is composed of FIGS. 1A and 1B is a block diagram showing a conventional image pickup apparatus.

The same reference numerals in FIGS. 2A and 2B denote the same parts as in the prior art shown in FIGS. 1A and 1B, and a viewpoint detection optical system 12, a viewpoint position processing circuit 13, and a system control circuit 14 are added to the arrangement shown in FIGS. 1A and 1B.

Normally, a photographer performs a photographing operation while watching an image displayed on the electronic viewfinder 11 for monitoring. In this case, the photographer gazes a target object. The gazing position (viewpoint position) of the photographer on the screen of the electronic viewfinder 11 is considered as the position of a target main object of the photographer. The viewpoint detection optical system 12 is arranged in the electronic viewfinder 11, and the viewpoint position processing circuit 13 calculates the viewpoint position of the photographer on the basis of a detection signal from the viewpoint detection optical system 12.

The viewpoint position information obtained by the viewpoint position processing circuit 13 is supplied to the system control circuit 14. The system control circuit 14 comprises, in units of program modes, look-up tables (LUTs) each of which stores setting data of an image area upon execution of video signal detection for exposure control, setting data of weighting coefficients of a plurality of image detection data, and setting data of exposure control parameters for an aperture mechanism, AGC, electronic shutter, and the like so as to realize exposure control in the program modes which are set for typical objects and photographing conditions like in the prior art. More specifically, the system control circuit 14 comprises an LUT 11 corresponding to program mode 1, an LUT 21 corresponding to program mode 2, an LUT 31 corresponding to program mode 3, and LUT 41 corresponding to program mode 4.

The program modes are controlled in such a manner that data in the look-up table corresponding to the program mode set by a program mode change unit 19 is read out, and respective parameters are controlled based on the readout data. In this case, the detection area (photometry area) and detection position of a video signal for exposure control, which are set by a gate pulse control circuit 18, are set to track the viewpoint position information output from the viewpoint position processing circuit 13.

Figure 5C:
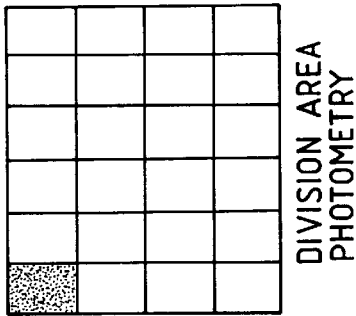
FIGS. 5A to 5E are views showing image detection areas in respective photometry methods.
Figure 5B:
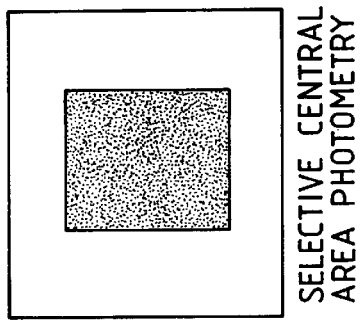
Figure 5A:
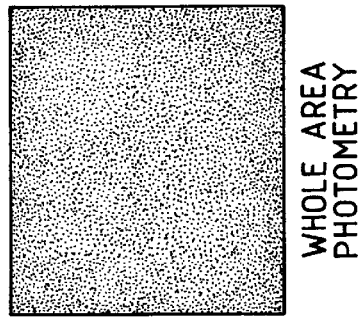
Figure 5E:
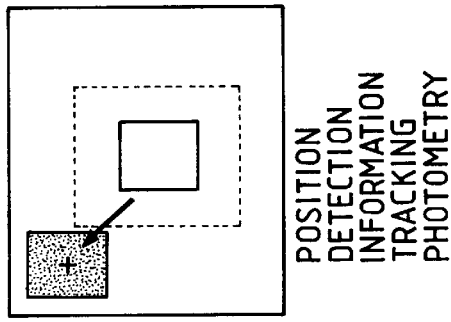
Figure 5D:
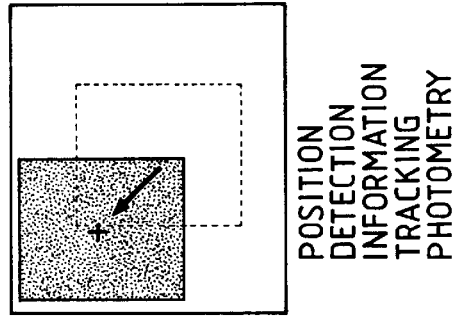

For example, when exposure control is performed based on selective central area photometry, as shown in FIG. 5B, if a photographer performs a photographing operation while gazing a main object when the main object moves from the central portion to the upper left portion of the screen, the viewpoint position information output from the viewpoint position processing circuit 13 also changes from the center to the upper left portion, and the position setting data of selective central area gate pulses as a control signal for moving a photometry area to be subjected to the selective central area photometry is moved from the center to the upper left portion accordingly, as shown in FIG. 5D. With this control, even when the target main object of the photographer moves in the screen, exposure control can always be performed with a proper exposure state of the main object without missing the main object from the photometry area.

When the area setting data of the selective central area gate pulses and the area to track the viewpoint position information are changed in correspondence with a selected program mode, control more suitable for a photographing operation of a photographing condition and an object assumed in the selected program mode can be realized. For example, in a program mode which assumes a photographing condition in which a main object is illuminated with spot light, and its surrounding portion is dark, if a portion illuminated with the spot light is small, detection data obtained from the selective central gate area is averaged under the influence of the dark surrounding portion, and an accurate exposure state of the main object cannot be detected. In order to prevent this, the detection area is reduced to track the viewpoint position information, as shown in FIG. 5E, thus obtaining accurate exposure information of the main object.

In the "portrait mode" described in the prior art, or in a program mode which assumes a photographing operation of a landscape, since a main object does not move, the area for tracking the setting position of the selective central area gate pulses to the viewpoint position information is limited to the central portion, and in particular, tracking movement to the upper portion is limited so as to prevent an abrupt change in exposure which occurs when a photographer erroneously gazes the sky with a large luminance difference, thereby maintaining an optimal exposure state of the main object even when the photographer gazes a portion other than the main object.

The system control circuit 14 comprises the LUTs 11, 21, 31, and 41 corresponding to the respective program modes, which LUTs store setting data of the tracking area corresponding to viewpoint information, selective central gate area, and the like in addition to the conventional LUT contents. The stored data are read out as needed, and control units of the respective parameters are controlled based on the readout data.

The LUTs according to the first embodiment of the present invention will be described in detail below with reference to FIGS. 10 to 12B in comparison with the conventional LUTs.

Each of the conventional LUTs stores only control values, suitable for a photographing condition assumed in each of program modes 1 to 4, of parameter setting data of an iris, AGC, and electronic shutter as a data table, as shown in column (A) in FIG. 10. Each of the LUTs of the first embodiment stores parameter setting data of the size of photometry area to track viewpoint position information of the viewpoint position detection means, and the tracking area in addition to the conventional data table shown in column (A), as shown in column (B) in FIG. 10. The size of photometry area to track viewpoint position information of the viewpoint position detection means, and the tracking area can be set, as shown in FIG. 11 and FIGS. 12A and 12B, and the LUTs store optimal setting values corresponding to the program modes.

As described above, in the first embodiment of the present invention, the photometry area of the selective central area photometry is set to track position information from the viewpoint position detection means, and the photometry area and the tracking area suitable for each program mode are set in units of program modes. However, parameters to be set are not limited to these. Control parameters associated with exposure control such as weighting setting data of detection data obtained by detecting a plurality of photometry areas, setting data of response characteristics upon change in exposure, and the like are combined with information output from the viewpoint position detection means, and setting data suitable for each program mode are set in units of program modes.

Figure 3B:
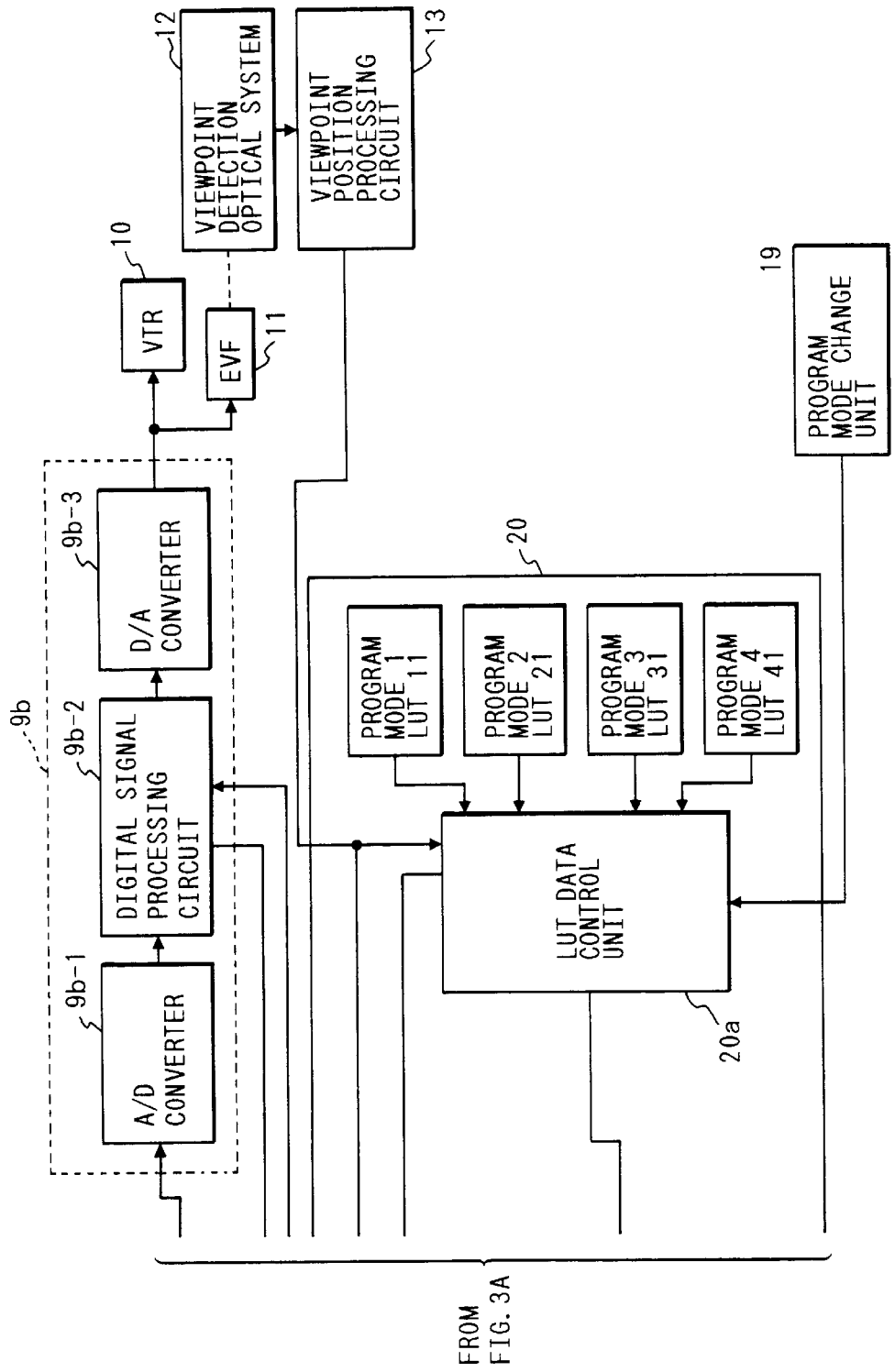
FIG. 3 which is composed of FIGS. 3A and 3B is a block diagram showing the arrangement according to the second embodiment of the present invention.

FIGS. 3A and 3B are block diagrams showing the arrangement according to the second embodiment of the present invention.

In the first embodiment, the analog signal processing circuit 9a shown in FIG. 13 is used as a camera signal processing circuit 9. In the second embodiment, a signal is processed in the state of digital data using a digital signal processing circuit 9b, which comprises an analog-to-digital converter 9b-1, a digital-to-analog converter 9b-3, and a digital signal processing circuit 9b-2.

Furthermore, the AE detection circuit 15, exposure control circuit 16, and gate pulse control circuit 18 of the first embodiment are assembled in a system control circuit 20 which comprises, e.g., a microcomputer, and has different internal processing from that of the system control circuit 14 of the first embodiment, and the processing of these circuits is performed in the state of digital data. In this case, the AE detection circuit 15 comprises an AE detection unit 15e and an AE detection area control unit 15f. The processing of these circuits is substantially the same as that in the first embodiment, except that a digital signal is processed, and the same effect as in the first embodiment can be obtained.

Figure 4B:
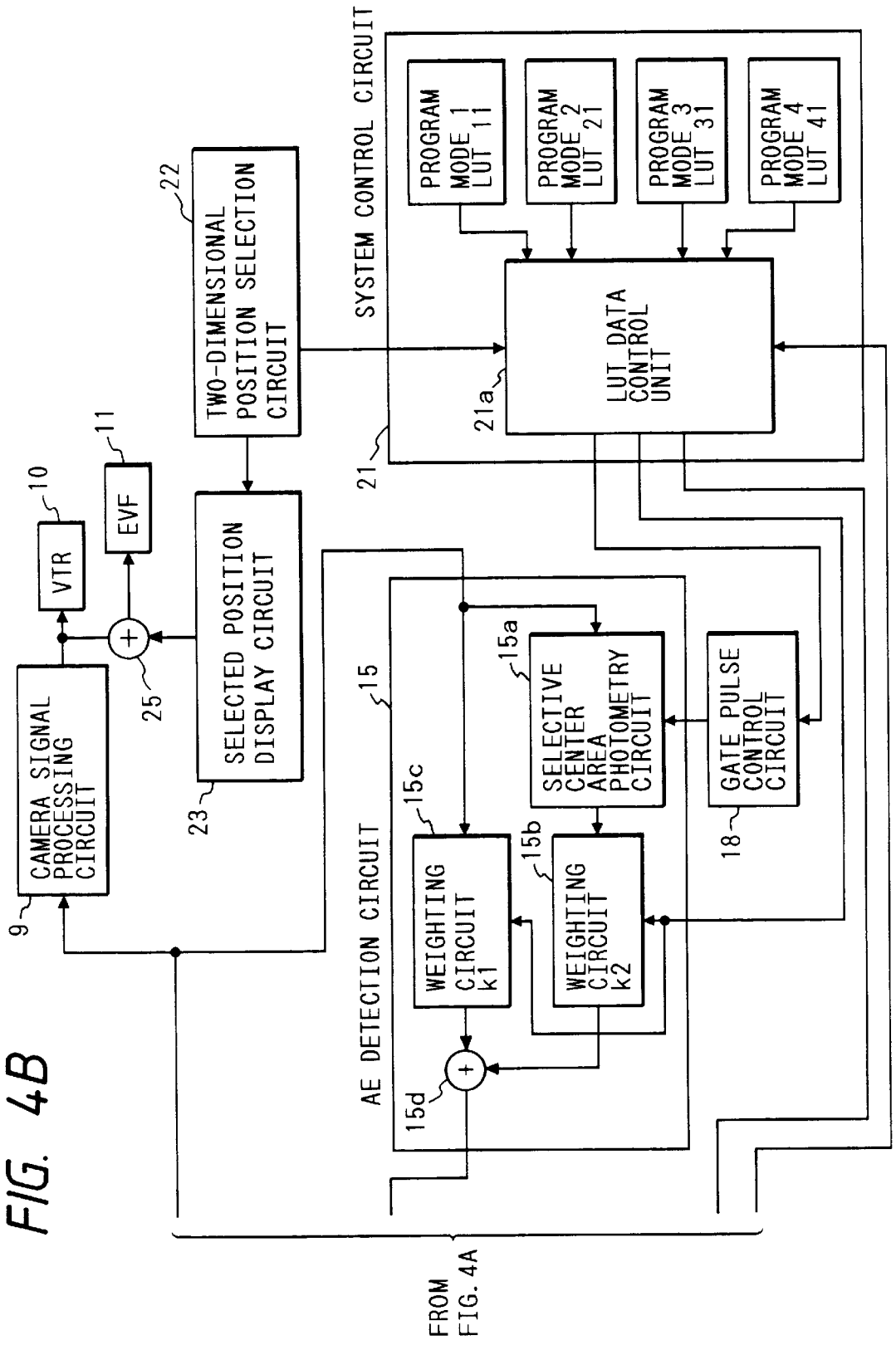
FIG. 4 which is composed of FIGS. 4A and 4B is a block diagram showing the arrangement according to the third embodiment of the present invention.

FIGS. 4A and 4B are block diagrams showing the arrangement according to the third embodiment of the present invention.

In the basic arrangement, the analog signal processing circuit 9a shown in FIG. 13 is used as the camera signal processing circuit 9 as in the first embodiment. Alternatively, the digital signal processing circuit 9b may be used as in the second embodiment. As the characteristic feature of the third embodiment, a two-dimensional position selection circuit 22 with which a photographer selects an image area by an external key input, and an adder 25 are used as a two-dimensional position selection means, and a selected position display circuit 23 makes a display, with which the selected image area can be confirmed, on the screen of the electronic viewfinder 11. The gate pulse position is set to track position detection information from the two-dimensional position selection circuit 22 as in the case wherein the viewpoint position detection means in the electronic viewfinder 11 in the first and second embodiments is used, and different exposure control parameters such as the size of gate pulses, weighting coefficients, response characteristics of exposure control, and the like are set in correspondence with whether or not the tracking operation is performed, thus optimally controlling the exposure operation for a target object of a photographer.

Note that the two-dimensional position selection circuit 22 includes a joystick, track ball, mouse, touch panel, and the like. With this arrangement, an easy operation is attained, and a low-cost apparatus can be realized.

As described above, according to the above-mentioned embodiments, the two-dimensional position selection means for selecting a target image area of a photographer is arranged, and exposure control is performed for an image area corresponding to the position information from the two-dimensional position selection means. Thus, the exposure state of a target main object of a photographer can be optimally controlled, and an image as the photographer intended can be provided. The above-mentioned control can be combined with program mode control, and an image optimal for a photographing condition can be obtained as the photographer intended.

According to the above-mentioned embodiments, the viewpoint position detection means for detecting the viewpoint of a photographer on the screen of the electronic viewfinder is arranged, and exposure control is made in correspondence with the position information. The photographer's looking into the electronic viewfinder and adjusting his or her visual axis to a target main object alone allow automatic exposure control of the main object portion. For this reason, the exposure control of the main object can be optimally attained without disturbing a photographing operation, and an image as a photographer intended can be provided. The above-mentioned control can be combined with program mode control, and an image optimal for a photographing condition can be obtained as the photographer intended.

The fourth embodiment of the present invention will be described below. The background of this embodiment will be explained first.

Figure 14B:
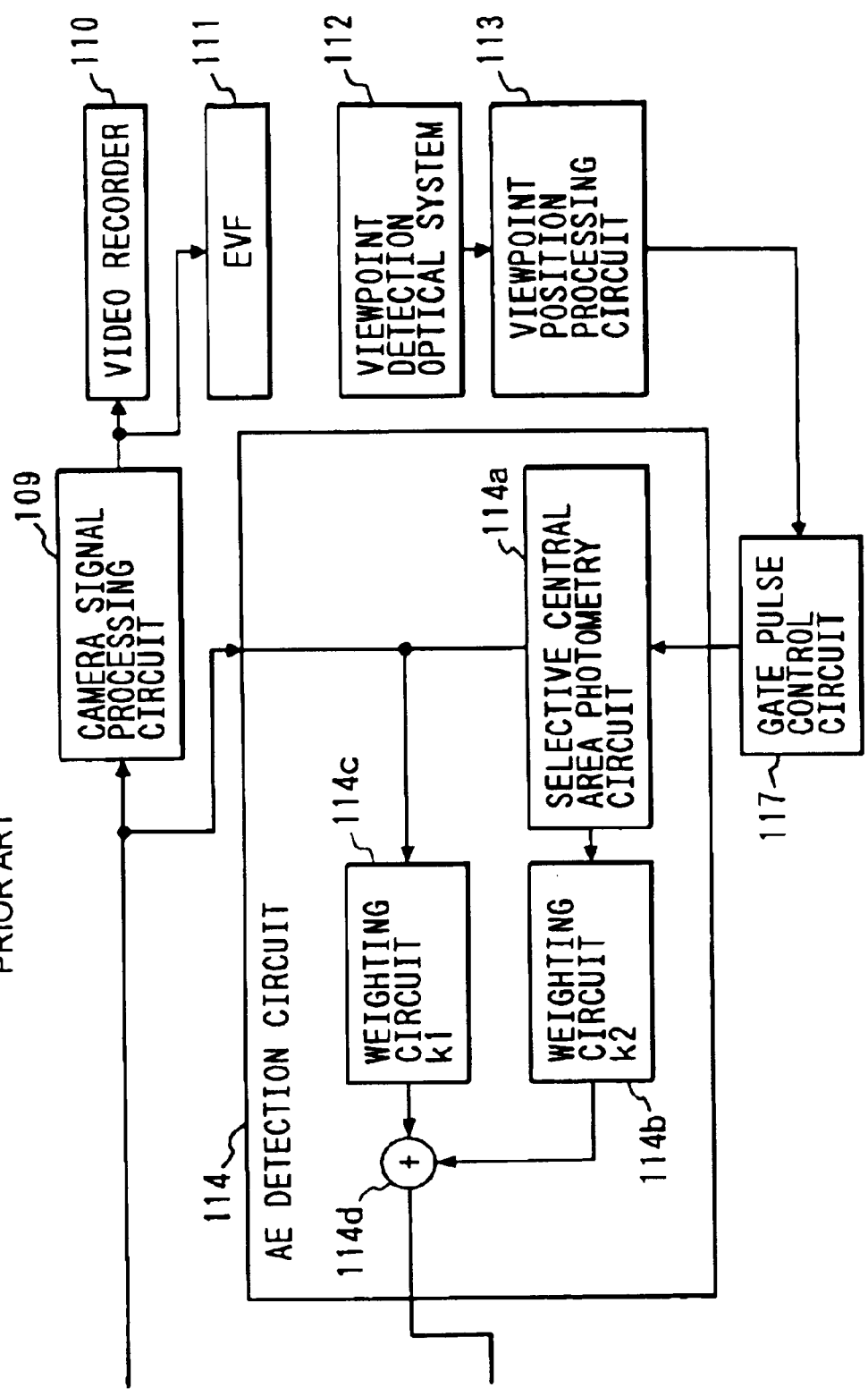
FIG. 14 which is composed of FIGS. 14A and 14B is a block diagram showing the arrangement of a conventional image pickup apparatus.
Figure 15B:
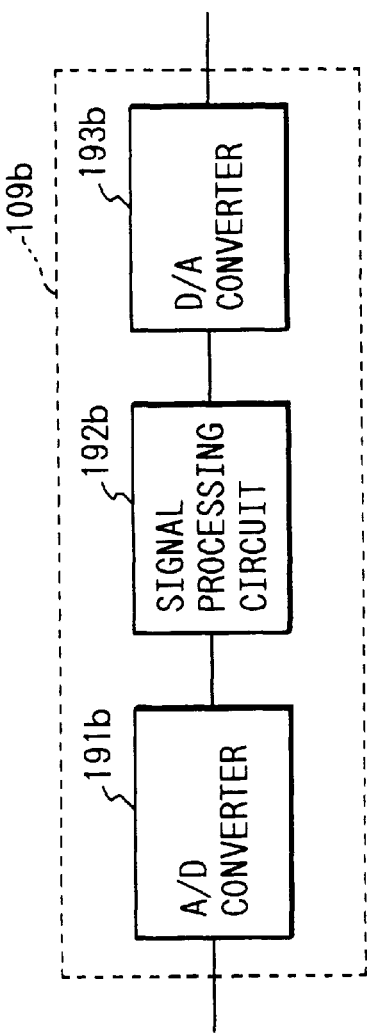
FIGS. 15A and 15B are diagrams showing signal processing circuits constituting a camera signal processing circuit of the image pickup apparatus shown in FIGS. 14A and 14B.
Figure 15A:
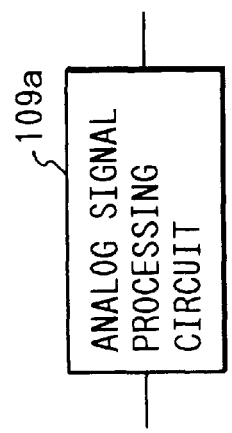

FIGS. 14A and 14B are block diagrams showing the arrangement of an image pickup apparatus as a prior art of this embodiment, FIGS. 15A and 15B are diagrams showing processing circuits constituting a camera signal processing circuit of the image pickup apparatus shown in FIGS. 14A and 14B, and FIGS. 16A to 16D are views showing image detection areas in respective photometry methods.

The image pickup apparatus comprises an optical lens 101 for forming an object image. An aperture mechanism 102 such as an iris for controlling the amount of light incident via the optical lens 101 is arranged behind the optical lens 101.

An image pickup element 103 is arranged behind the aperture mechanism 102. The image pickup element 103 has a photoelectric conversion function of converting an optical image formed on its front surface into a corresponding electrical signal. The electrical signal converted by the image pickup element 103 is supplied to a sampling & holding circuit (to be referred to as an S/H circuit hereinafter) 107.

The S/H circuit 107 samples the electrical signal from the image pickup element 103. The signal sampled by the S/H circuit 107 is supplied to an auto gain circuit (to be referred to as an AGC circuit hereinafter) 108.

The AGC circuit 108 electrically amplifies a signal output from the S/H circuit 107. The signal amplified by the AGC circuit 108 is supplied to a camera signal processing circuit 109 and an AE detection circuit 114.

The camera signal processing circuit 109 performs processing such as gamma correction, color separation, color difference matrix, and the like of the input signal, and thereafter, adds a synchronization signal to the processed signal to generate a standard television signal (to be referred to as a standard TV signal hereinafter). As the camera signal processing circuit 109, as shown in FIGS. 15A and 15B, an analog signal processing circuit 109a for performing the above-mentioned processing in an analog signal state, and a digital signal processing circuit 109b for analog-to-digital converting a video signal, performing the above-mentioned processing in a digital signal state, and thereafter, digital-to-analog converting the processed signal, are available. The digital signal processing circuit 109b comprises an A/D converter 191b arranged at the input side, a signal processing circuit 192b, and a D/A converter 193b arranged at the output side, as shown in FIG. 15B. In this embodiment, the analog signal processing circuit 109a is used as the camera signal processing circuit 109.

The TV signal output from the camera signal processing circuit 109 is supplied to a video recorder 110 and an electronic viewfinder (to be referred to as an EVF hereinafter) 111. The video recorder 110 records the TV signal on a recording medium such as a magnetic tape.

The EVF 111 displays a monitor image on a screen on the basis of the TV signal.

The AE detection circuit 114 fetches a signal from the AGC circuit 108 in correspondence with the presence/absence of gate pulses from a gate pulse control circuit 117, performs photometry for exposure control such as selective central area photometry, on the basis of the fetched signal, and generates a signal representing the photometry result.

More specifically, the AE detection circuit 114 includes a selective central area photometry circuit 114a, a weighting circuit 114b for weighting (with a coefficient k2) an output from the selective central area photometry circuit 114a, a weighting circuit 114c for weighting (with a coefficient k1) a signal from the AGC circuit 108, and an adder 114d for adding the outputs from the weighting circuits 114b and 114c.

A signal output from the AE detection circuit 114 is supplied to an exposure control circuit 115. The exposure control circuit 115 comprises an exposure control operation unit 115a for generating a control instruction signal to an AGC control unit 115b, a control instruction signal to an electronic shutter control unit 115c, and a control instruction signal to an iris control unit 115d, so that a signal from the AE detection circuit 114 has an optimal exposure state.

The AGC control unit 115b controls the gain of the AGC circuit 108 on the basis of the control instruction signal.

The electronic shutter control unit 115c controls an image pickup element control circuit 106 on the basis of the control instruction signal. The image pickup element control circuit 106 controls a so-called electronic shutter function of reading out the photoelectrically converted electrical signal from the image pickup element 103, and controlling the accumulation time of the electrical signal.

The iris control unit 115d controls an iris driving circuit 116 on the basis of the control instruction signal, and the iris driving circuit 116 controls the driving operation of a motor 105 for driving the aperture mechanism 102.

An image displayed on the screen of the EVF 111 is observed by a photographer. The viewpoint position, on the screen of the EVF 111, of the photographer is detected by a viewpoint position processing circuit 113 via a viewpoint detection optical system 112. The viewpoint position processing circuit 113 instructs the generation timing of gate pulses to the gate pulse control circuit 117 on the basis of the detected viewpoint position, on the screen, of the photographer.

In this image pickup apparatus, in order to perform an optimal photographing operation in various places and various conditions, the AE detection circuit 114 detects a change in exposure due to a change in object on the basis of a video signal, and the exposure control circuit 115 performs selection of exposure control parameters such as the aperture mechanism 102, the electronic shutter for controlling the accumulation time of the image pickup element 103, the gain of the AGC circuit 108, and determination of the correction amounts of these parameters on the basis of the detection signal from the AE detection circuit 114, thus realizing control for obtaining a stable, optimal exposure state all the time.

Figure 16A:
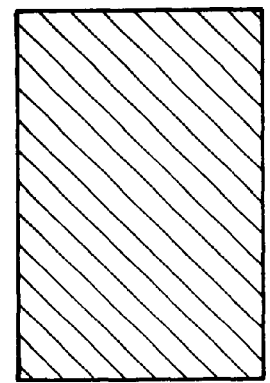
FIGS. 16A to 16D are views showing image detection areas in respective photometry methods.
Figure 16B:
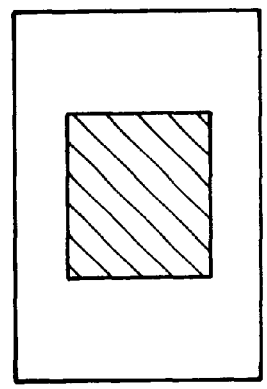

The AE detection circuit 114 controls the photometry distribution on the basis of the photometry area and detection position of a video signal for exposure control, which are set by the gate pulse control circuit 117, thus realizing an optimal photographing operation. For example, the AE detection circuit 114 can realize so-called average photometry which detects a whole image area, and performs exposure control, so that the detection signal from the whole image area has a predetermined level, as shown in FIG. 16A. Also, the AE detection circuit 114 realizes selective central area photometry which detects only a central portion of the image area, and performs exposure control, so that the detection signal from the control image area has a predetermined level, as shown in FIG. 16B.

When the AE detection circuit 114 performs exposure control on the basis of detection data obtained by weighting detection data from the whole image area and the selective central area in the weighting circuits 114b and 114c, and adding the weighted data at a predetermined ratio, exposure control based on a photometry method as a combination of the average photometry and selective central area photometry can be realized. Thus, disadvantages of these two photometry methods can be compensated for, and optimal exposure control can be realized.

Figure 16C:
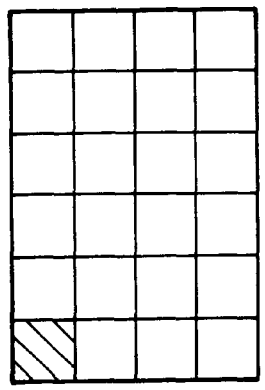

Also, as shown in FIG. 16C, the frame is divided into division areas, image detection is performed in units of division areas, the areas of detection data used in exposure control are limited or the weighting coefficient is optimized in correspondence with an object or a photographing condition in each program mode, thus allowing flexible exposure control.

However, even in the exposure control based on the program mode, exposure control, which places an importance on the signal detection result obtained by detecting the brightness of a central portion under the assumption that a target object is present at the central portion of an image, is normally performed. Since the signal detection area is set at the central portion, when the target object of a photographer is offset from the central portion, optimal exposure control for the object cannot be attained.

In order to solve this problem, an image pickup apparatus, which uses two-dimensional position selection means for selecting a portion of an image area aimed by a photographer, and comprises means for detecting the exposure state of the portion corresponding to the image area selected by the two-dimensional position selection means, and performing exposure control based on the detection signal, has been proposed. As the two-dimensional position selection means, a visual axis (viewpoint position) detection apparatus is used, as described above.

Exposure control using position information output from the viewpoint position detection means will be explained below.

Normally, a photographer performs a photographing operation while watching an image displayed on the EVF 111. In this case, the photographer gazes a target object. The viewpoint position of the photographer on the screen of the EVF 111 is considered as the position of a target main object of the photographer, and this position is calculated by the viewpoint position processing circuit 113 via the viewpoint detection optical system 112.

Figure 16D:
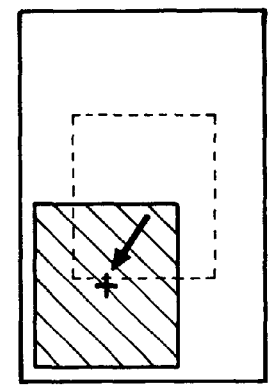

The calculated viewpoint position of the photographer is supplied to the gate pulse control circuit 117 as viewpoint position information, and the gate pulse control circuit 117 generates gate pulses for setting an image area used in video signal detection. For example, when the selective central area photometry is normally performed, if the photographer moves his or her visual axis from a central object to an upper left object displayed on the EVF 111, the gate pulse control circuit 117 generates gate pulses to track the viewpoint position information, so that the viewpoint position changes from the central position to the upper left position, as shown in FIG. 16D. As a result, the image area as a video signal detection area changes from the central area to the upper left area. Thus, control is made to optimize the exposure state of the upper left portion of the screen, and by only directing the visual axis toward a target object, the exposure state of an object which is gazed by a photographer can be optimally set.

However, in the exposure control method which tracks the viewpoint position information from the above-mentioned two-dimensional position selection means, when position information abruptly changes, and viewpoint position information continuously changes to an object with a large luminance difference like in a case wherein an object which moves fast is to be photographed in the outer air with a large luminance difference, the exposure state changes to track the viewpoint position information. As a result, the exposure state becomes unstable, resulting in a poor image.

Also, the photographer does not always gaze an object, and frequently watches information of functions of compensating for a photographing operation, such as a tape counter, remaining battery amount, zoom position, and the like. For this reason, each time the viewpoint position of the photographer deviates from an object, the exposure state changes, and it is difficult to hold a constant exposure state for an object aimed by the photographer.

It is an object of this embodiment to provide an image pickup apparatus which can optimally perform exposure control for a target object of a photographer without being influenced by a photographing condition.

In order to achieve this object, according to this embodiment, there is disclosed an image pickup apparatus comprising an image pickup element for converting an optical image in an image pickup area into an electrical signal, signal processing means for generating a video signal serving as a television signal by processing the electrical signal from the image pickup element, two-dimensional position selection means for selecting at least a portion of an image area included in an image indicated by the video signal, video signal detection means for detecting an exposure state of an image in the selected image area, and generating a detection signal indicating a detection result, exposure control means for optimally controlling the exposure state of the image in the selected image area on the basis of exposure control parameters while tracking the detection signal of the video signal detection means, photographing condition detection means for detecting a photographing condition on the basis of a control state of the exposure control parameters and a control state of functions of compensating for a photographing operation, and optimizing means for optimizing setting data of the exposure control parameters associated with exposure control, which is performed to track the detection signal of the video signal detection means, in correspondence with the detected photographing condition.

There is also disclosed an image pickup apparatus further comprising monitor means for confirming an image by displaying the image indicated by the video signal on a screen, and wherein the two-dimensional position selection means comprises viewpoint position detection means for detecting a position on the screen of the monitor means, where a photographer gazes, as the selected image area.

There is also disclosed an image pickup apparatus, wherein the two-dimensional position selection means comprises input means such as a joystick, track ball, mouse, touch panel, or the like.

There is also disclosed an image pickup apparatus, wherein the exposure control parameters include control parameters of an iris, auto-gain control, an electronic shutter, and the like.

There is also disclosed an image pickup apparatus, wherein the functions of compensating for the photographing operation include a division area photometry result, white balance, auto-focus, an anti-vibration function, and the like.

FIGS. 17A and 17B are block diagrams showing the arrangement of an image pickup apparatus according to the fourth embodiment of the present invention, FIGS. 18A to 18C are views showing the tracking areas of photometry areas with respect to the viewpoint position of a photographer in the image pickup apparatus shown in FIGS. 17A and 17B, FIGS. 19A to 19C are views showing areas to be preponderantly subjected to photometry with respect to the viewpoint position of a photographer in the image pickup apparatus shown in FIGS. 17A and 17B, and FIG. 20 is a table showing the description contents of an LUT used in the image pickup apparatus shown in FIGS. 17A and 17B.

As shown in FIGS. 17A and 17B, the image pickup apparatus comprises an optical lens 101 for forming an object image. An aperture mechanism 102 such as an iris for controlling the amount of light incident via the optical lens 101 is arranged behind the optical lens 101.

An image pickup element 103 is arranged behind the aperture mechanism 102. The image pickup element 103 has a photoelectric conversion function of converting an optical image formed on its front surface into a corresponding electrical signal. The electrical signal converted by the image pickup element 103 is supplied to a sampling & holding circuit (to be referred to as an S/H circuit hereinafter) 107.

The S/H circuit 107 samples the electrical signal from the image pickup element 103. The signal sampled by the S/H circuit 107 is supplied to an auto gain circuit (to be referred to as an AGC circuit hereinafter) 108.

The AGC circuit 108 electrically amplifies a signal output from the S/H circuit 107. The signal amplified by the AGC circuit 108 is supplied to a camera signal processing circuit 109 and an AE detection circuit 114.

The camera signal processing circuit 109 performs processing such as gamma correction, color separation, color difference matrix, and the like of the input signal, and thereafter, adds a synchronization signal to the processed signal to generate a standard television signal (to be referred to as a standard TV signal hereinafter). The camera signal processing circuit 109 comprises an analog signal processing circuit for performing the above-mentioned processing in an analog signal state. In this embodiment, the camera signal processing circuit 109 comprises an analog signal processing circuit, but may comprise a digital signal processing circuit instead.

The TV signal output from the camera signal processing circuit 109 is supplied to a video recorder 110 and an EVF 111. The video recorder 110 records the TV signal on a recording medium such as a magnetic tape.

The EVF 111 displays a monitor image on a screen on the basis of the TV signal.

The AE detection circuit 114 fetches a signal from the AGC circuit 108 in correspondence with the presence/absence of gate pulses from a gate pulse control circuit 117, performs photometry for exposure control such as selective central area photometry, on the basis of the fetched signal, and generates a signal representing the photometry result.

More specifically, the AE detection circuit 114 includes a selective central area photometry circuit 114a, a weighting circuit 114b for weighting (with a coefficient k2) an output from the selective central area photometry circuit 114a, a weighting circuit 114c for weighting (with a coefficient k1) a signal from the AGC circuit 108, and an adder 114d for adding the outputs from the weighting circuits 114b and 114c.

A signal output from the AE detection circuit 114 is supplied to an exposure control circuit 115. The exposure control circuit 115 comprises an exposure control operation unit 115a for generating a control instruction signal to an AGC control unit 115b, a control instruction signal to an electronic shutter control unit 115c, and a control instruction signal to an iris control unit 115d, so that a signal from the AE detection circuit 114 has an optimal exposure state. The control signals generated by the exposure control operation unit 115a are also supplied to a system control circuit 118.

The AGC control unit 115b controls the gain of the AGC circuit 108 on the basis of the control instruction signal.

The electronic shutter control unit 115c controls an image pickup element control circuit 106 on the basis of the control instruction signal. The image pickup element control circuit 106 controls a so-called electronic shutter function of reading out the photoelectrically converted electrical signal from the image pickup element 103, and controlling the accumulation time of the electrical signal.

The iris control unit 115d controls an iris driving circuit 116 on the basis of the control instruction signal, and the iris driving circuit 116 controls the driving operation of a motor 105 for driving the aperture mechanism 102.

An image displayed on the screen of the EVF 111 is observed by a photographer. The viewpoint position, on the screen of the EVF 111, of the photographer is detected by a viewpoint position processing circuit 113 via a viewpoint detection optical system 112. The viewpoint position processing circuit 113 outputs the detected viewpoint position, on the screen, of the photographer to the system control circuit 118 as viewpoint position information.

The system control circuit 118 comprises a photographing condition discrimination unit 118a that receives the respective control signals from the exposure control operation unit 115a. The photographing condition discrimination unit 118a discriminates the photographing condition on the basis of the received control signals. More specifically, the unit 118a detects the brightness and color temperature of an object on the basis of the control instruction signal to the AGC control unit 115b, the control instruction signal to the electronic shutter control unit 115c, and the control instruction signal to the iris control unit 115d, and discriminates based on the detected data if the photographing place is indoor or outdoor. Also, the unit 118a obtains the detailed luminance information of an object by division area photometry, as shown in FIG. 16C, and detects, based on this luminance information, the exposure states (such as back light, spot light, or the like) of a main object at the viewpoint position and a surrounding object, thereby discriminating the details of the photographing condition.

The photographing condition discriminated by the photographing condition discrimination unit 118a is supplied to a look-up table (LUT) control unit 118b. The LUT control unit 118b reads out optimal parameters from an LUT 118c on the basis of the photographing condition. The LUT 118c stores parameters such as photometry areas, tracking areas, tracking speeds, weighting ratios, exposure control parameters, and the like in units of photographing conditions, as shown in FIG. 20.

The parameters read out from the LUT 118c are supplied to an exposure parameter correction unit 118d. The exposure parameter correction unit 118d corrects the parameters to track the viewpoint position information. For example, the unit 118d changes the coefficients of the weighting circuits 114b and 114c, and instructs the gate pulse generation timing to the gate pulse control circuit 117.

In this image pickup apparatus, in order to perform an optimal photographing operation in various places and various conditions, the AE detection circuit 114 detects a change in exposure due to a change in object on the basis of a video signal, and the exposure control circuit 115 performs selection of exposure control parameters such as the aperture mechanism 102, the electronic shutter for controlling the accumulation time of the image pickup element 103, the gain of the AGC circuit 108, and determination of the correction amounts of these parameters on the basis of the detection signal from the AE detection circuit 114, thus realizing control for obtaining a stable, optimal exposure state all the time.

The AE detection circuit 114 controls the photometry distribution on the basis of the photometry area and detection position of a video signal for exposure control, which are set by the gate pulse control circuit 117, thus realizing an optimal photographing operation.

For example, when the photographing condition is discriminated to be an outdoor photographing operation, if the tracking area of the viewpoint position information is wide, as shown in FIG. 18A, an object with a large luminance difference under the influence of, e.g., the sky is mixed, and an unstable exposure state tends to be obtained if the exposure state sensitively tracks the viewpoint position information. In such a photographing condition, the area to be preponderantly subjected to photometry with respect to the viewpoint position is widened, as shown in FIG. 19A, and the tracking area of the photometry area is narrowed by inhibiting the tracking operation to the upper portion of the screen, as shown in FIG. 18B. Therefore, even when a photographer inadvertently gazes the sky, no change in exposure state occurs, and even when an object at the viewpoint position suffers a large change in luminance, the detected signal does not change abruptly due to the wide photometry area, thus allowing a smooth exposure tracking operation.

On the other hand, when the photographing condition is discriminated to be an indoor photographing operation, since an object does not normally has a large luminance difference, the tracking operation with respect to viewpoint position information can be performed over the entire area, and parameters can be set, so that the exposure state sensitively tracks the viewpoint position without limiting the tracking area.

In a condition which is discriminated to be an indoor photographing operation, some objects may have a large luminance difference between the viewpoint portion and the surrounding portion like an object illuminated with spot light. In such a photographing condition, if the area to be preponderantly subjected to photometry with respect to the viewpoint position is wide, as shown in FIG. 19A, a bright portion illuminated with the spot light and a non-illuminated, dark portion are mixed in the photometry area, obtained detection signals are averaged, and accurate exposure information cannot be obtained. In order to prevent this, as shown in FIG. 19C, a small area to be preponderantly subjected to photometry with respect to the viewpoint position is set to detect an accurate exposure state of an object at the viewpoint position, and the weighting coefficient of detection data obtained from the photometry area corresponding to the viewpoint portion is set to be larger than that for detection data of the surrounding portion, thus optimizing the exposure state of the object of the viewpoint portion.

However, in the above-mentioned setting state, when a photographer moves his or her eye from a main object to watch the screen display in the EVF 111, the exposure state changes considerably. In order to prevent this, when the viewpoint position information changes abruptly, the parameters associated with exposure control are optimized to inhibit a sensitive tracking operation in such a manner that the response characteristics of an iris are lowered in correspondence with the position change amount, or the tracking operation of the exposure state is temporarily stopped until the change amount of position information falls within a predetermined value range.

Since the setting values of the parameters optimized in correspondence with photographing conditions are stored in the LUT 118c of the system control circuit 118, data corresponding to the detected photographing condition is read out from the LUT 118c, and the exposure control parameters are corrected on the basis of the readout data.

With the above-mentioned control, exposure control for a target object of a photographer can be optimally performed without being influenced by the photographing condition.

In this embodiment, the setting values of the exposure control parameters to track the viewpoint position are changed in correspondence with control values such as the iris, AGC, electronic shutter, white balance, and the like, thereby attaining exposure control suitable for each photographing condition. However, the parameters used for discriminating a photographing condition, exposure control parameters, and the like are not limited to the above-mentioned parameters.

The fifth embodiment of the present invention will be described below with reference to the accompanying drawings.

Figure 21B:
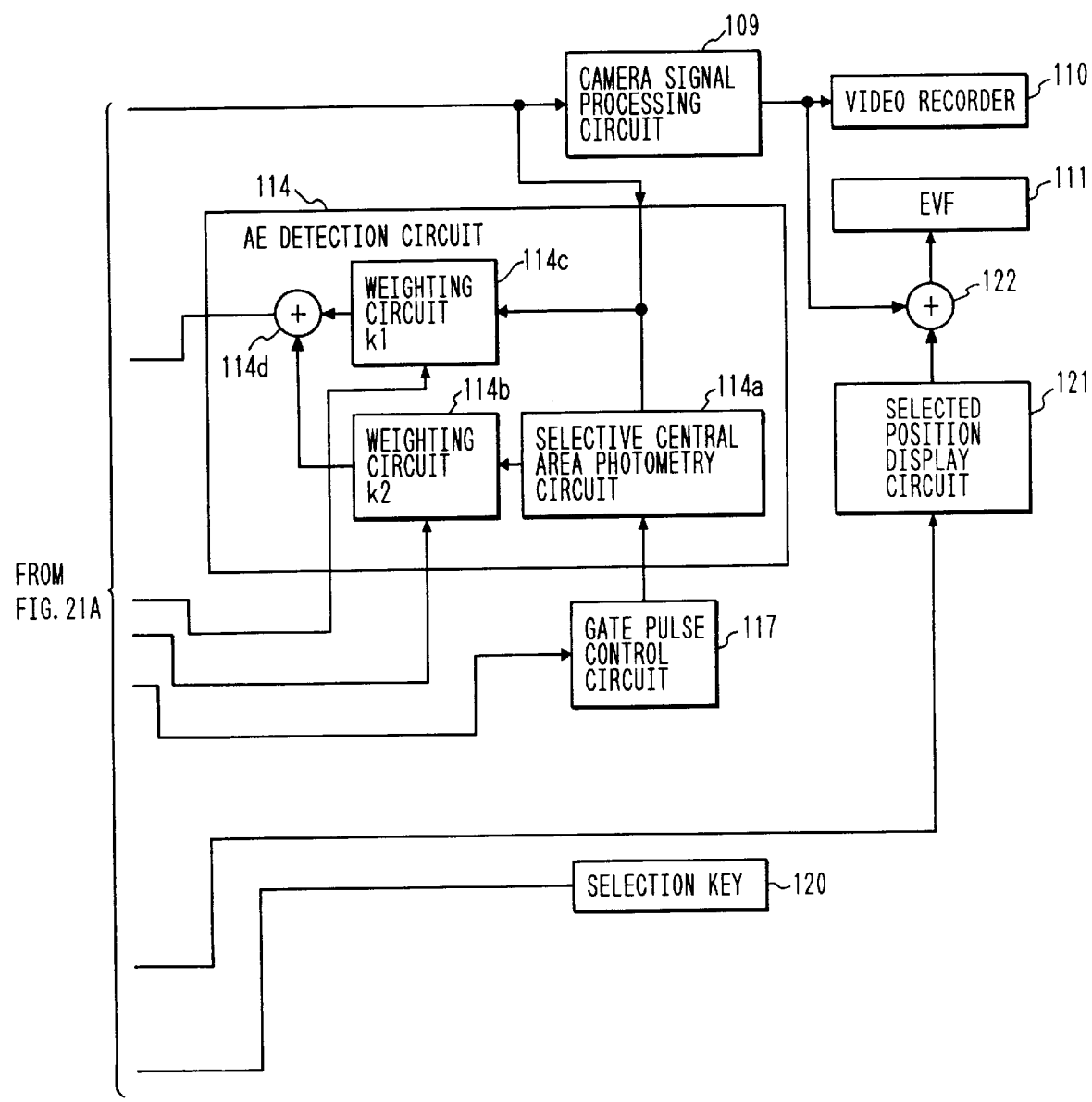
FIG. 21 which is composed of FIGS. 21A and 21B is a block diagram showing the arrangement of an image pickup apparatus according to the fifth embodiment of the present invention.

FIGS. 21A and 21B are block diagrams showing an image pickup apparatus according to the fifth embodiment of the present invention.

As shown in FIGS. 21A and 21B, the image pickup apparatus comprises an optical lens 101 for forming an object image. An aperture mechanism 102 such as an iris for controlling the amount of light incident via the optical lens 101 is arranged behind the optical lens 101.

An image pickup element 103 is arranged behind the aperture mechanism 102. The image pickup element 103 has a photoelectric conversion function of converting an optical image formed on its front surface into a corresponding electrical signal. The electrical signal converted by the image pickup element 103 is supplied to a sampling & holding circuit (to be referred to as an S/H circuit hereinafter) 107.

The S/H circuit 107 samples the electrical signal from the image pickup element 103. The signal sampled by the S/H circuit 107 is supplied to an auto gain circuit (to be referred to as an AGC circuit hereinafter) 108.

The AGC circuit 108 electrically amplifies a signal output from the S/H circuit 107. The signal amplified by the AGC circuit 108 is supplied to a camera signal processing circuit 109 and an AE detection circuit 114.

The camera signal processing circuit 109 performs processing such as gamma correction, color separation, color difference matrix, and the like of the input signal, and thereafter, adds a synchronization signal to the processed signal to generate a standard television signal (to be referred to as a standard TV signal hereinafter). The camera signal processing circuit 109 comprises an analog signal processing circuit for performing the above-mentioned processing in an analog signal state.

The TV signal output from the camera signal processing circuit 109 is supplied to a video recorder 110 and an adder 122. The video recorder 110 records the TV signal on a recording medium such as a magnetic tape.

The AE detection circuit 114 fetches a signal from the AGC circuit 108 in correspondence with the presence/absence of gate pulses from a gate pulse control circuit 117, performs photometry for exposure control such as selective central area photometry, on the basis of the fetched signal, and generates a signal representing the photometry result.

More specifically, the AE detection circuit 114 includes a selective central area photometry circuit 114a, a weighting circuit 114b for weighting (with a coefficient k2) an output from the selective central area photometry circuit 114a, a weighting circuit 114c for weighting (with a coefficient k1) a signal from the AGC circuit 108, and an adder 114d for adding the outputs from the weighting circuits 114b and 114c.

A signal output from the AE detection circuit 114 is supplied to an exposure control circuit 115. The exposure control circuit 115 comprises an exposure control operation unit 115a for generating a control instruction signal to an AGC control unit 115b, a control instruction signal to an electronic shutter control unit 115c, and a control instruction signal to an iris control unit 115d, so that a signal from the AE detection circuit 111 has an optimal exposure state. The control signals generated by the exposure control operation unit 115a are also supplied to a system control circuit 119.

The AGC control unit 115b controls the gain of the AGC circuit 108 on the basis of the control instruction signal.

The electronic shutter control unit 115c controls an image pickup element control circuit 106 on the basis of the control instruction signal. The image pickup element control circuit 106 controls a so-called electronic shutter function of reading out the photoelectrically converted electrical signal from the image pickup element 103, and controlling the accumulation time of the electrical signal.

The iris control unit 115d controls an iris driving circuit 116 on the basis of the control instruction signal, and the iris driving circuit 116 controls the driving operation of a motor 105 for driving the aperture mechanism 102.

An object position gazed by a photographer is indicated by a selection key 120, and this indication information is supplied to the system control circuit 19. The selection key 120 comprises input means such as a joystick, track ball, mouse, touch panel, or the like.

The system control circuit 119 comprises a photographing condition discrimination unit 119a that receives the respective control signals from the exposure control unit 115a. The photographing condition discrimination unit 119a discriminates the photographing condition on the basis of the received control signals. More specifically, the unit 119a detects the brightness and color temperature of an object on the basis of the control instruction signal to the AGC control unit 115b, the control instruction signal to the electronic shutter control unit 115c, and the control instruction signal to the iris control unit 115d, and discriminates based on the detected data if the photographing place is indoor or outdoor. Also, the unit 119a obtains the detailed luminance information of an object by division area photometry, and detects, based on this luminance information, the exposure states (such as back light, spot light, or the like) of a main object at the viewpoint position and a surrounding object, thereby discriminating the details of the photographing condition.

The photographing condition discriminated by the photographing condition discrimination unit 119a is supplied to a look-up table (LUT) control unit 119b. The LUT control unit 119b reads out optimal parameters from an LUT 119c on the basis of the photographing condition. The LUT 119c stores parameters such as photometry areas, tracking areas, tracking speeds, weighting ratios, exposure control parameters, and the like in units of photographing conditions.

The parameters read out from the LUT 119c are supplied to an exposure parameter correction unit 119d. The exposure parameter correction unit 119d corrects the parameters to track a selected position which is detected by a selected position detection unit 119e based on an instruction from the selection key 120. For example, the unit 119d changes the coefficients of the weighting circuits 114b and 114c, and instructs the gate pulse generation timing to the gate pulse control circuit 117.

The selected position detected by the selected position detection unit 119e is supplied to a selected position display circuit 121. The selected position display circuit 121 generates a display signal for displaying the selected position, and supplies the display signal to an adder 122.

The adder 122 adds the TV signal from the camera signal processing circuit 109, and the display signal, and outputs the sum signal to an EVF 111.

The EVF 111 displays an image represented by the TV signal and the selected position represented by the display signal on its screen.

With the above-mentioned control, since the setting values of the parameters which are optimized in correspondence with different photographing conditions are stored in the LUT 119c in the system control circuit 119, data corresponding to the detected photographing condition are read out from the LUT 119c, and the exposure control parameters are corrected on the basis of the readout data. Thus, exposure control for an object selected by a photographer using the selection key 120 can be optimally performed without being influenced by the photographing condition.

As described above, according to the above-mentioned embodiments, the image pickup element converts an optical image in an image pickup area into an electrical signal, and the signal processing means processes the electrical signal from the image pickup element to generate a video signal serving as a television signal. The two-dimensional position selection means selects at least a portion of an image area included in an image indicated by the video signal, and the video signal detection means detects the exposure state of an image in the selected image area to generate a detection signal indicating the detection result. The exposure control means optimally controls the exposure state of the image in the selected image area on the basis of exposure control parameters to track the detection signal from the video signal detection means, and the photographing condition detection means detects the photographing condition on the basis of the control state of the exposure control parameters and the control state of functions of compensating for a photographing operation. Then, the optimizing means optimizes the setting values of the exposure control parameters associated with exposure control, which is executed to track the detection signal from the video signal detection means, in correspondence with the detected photographing condition. For this reason, exposure control for a target object of a photographer can be optimally executed without being influenced by the photographing condition.

According to the above-mentioned embodiments, since the monitor means for displaying an image indicated by the video signal on the screen to confirm the image is arranged, and the two-dimensional position selection means comprises the viewpoint position detection means for detecting a position on the screen of the monitor means, where the photographer gazes, as the selected image area, a target object of the photographer can be detected by a simple operation.

According to the above-mentioned embodiments, since the two-dimensional position selection means comprises input means such as a joystick, track ball, mouse, touch panel, or the like, a target object of the photographer can be detected by a simple operation using low-cost means.

According to the above-mentioned embodiments, since the exposure control parameters include exposure control parameters such as an iris, auto-gain control, electronic shutter, and the like, the parameters can be easily processed.

According to the above-mentioned embodiments, since the functions of compensating for the photographing operation include a division area photometry result, white balance, auto-focus, anti-vibration function, and the like, the operation conditions of these functions can be easily detected, and hence, the detection of the photographing condition can be facilitated.

What is claimed is:

1. An image pickup apparatus comprising:
   image pickup means having a photoelectric conversion function;
   position setting means for moving in an image screen a setting position of a photometry area for extracting an image signal obtained from said image pickup means;
   exposure control means for controlling an exposure state on the basis of the image signal corresponding to the photometry area;
   mode setting means for setting a plurality of program modes which can be selected in accordance with a photographing condition and are respectively set with control parameters for controlling the exposure state; and
   control means for moving the photometry area so as to track the setting position moved by said position setting means, said control means restricting a tracking range of the photometry area in accordance with the program mode set by said mode setting means.

2. An apparatus according to claim 1, wherein said mode setting means can set the plurality of program modes for optimizing a camera signal processing state such as gamma correction, aperture correction, and the like, a white-balance state, a focusing state, and the like, in addition to the exposure state, by controlling one or a plurality of control parameters under a condition optimal for a photographing condition under one or a plurality of typical photographing conditions, and causes said exposure control means to perform optimal exposure control corresponding to the selected program mode.

3. An apparatus according to claim 1, wherein the control parameters include a parameter for controlling a size of the photometry area.

4. An apparatus according to claim 1, wherein the control parameters include a parameter for controlling a moving range of the photometry area.

5. An apparatus according to claim 1, wherein the control parameters include a parameter for controlling a moving range of the photometry area and limiting movement of the photometry area to an upper portion of an image pickup surface of said image pickup means.

6. An apparatus according to claim 1, further comprising:
   means for setting an image detection area in first detection means for detecting the exposure state of the photometry area set by said position setting means, and for setting a range for tracking the image detection area with respect to the photometry area as control parameters associated with exposure control which is performed to track the detection signal of the photometry area set by said position setting means;
   second detection means for detecting an exposure state of an image area different from said first detection means for detecting the exposure state of the photometry area set by said position setting means at one or a plurality of positions; and
   weighting means for multiplying detection signals from said first and second detection means with predetermined weighting coefficients, wherein said mode setting means changes setting data of the detection area of said second detection means, setting data of the weighting coefficients to be multiplied with the detection signals of said first and second detection means by said weighting means, selecting data of exposure control parameters such as an aperture mechanism, auto-gain control, electronic shutter, and the like in said exposure control means, and setting data of response characteristics of exposure control, in correspondence with the program mode.

7. An image pickup apparatus comprising:
   image pickup means for converting an image formed on an image screen into an image signal;
   an electronic monitor for displaying an image corresponding to the image signal obtained from said image pickup means;
   viewpoint position detection means for detecting a position of a viewpoint of a photographer on a screen of said electronic monitor;
   exposure control means for moving a setting position of a photometry area on the image screen in accordance with the viewpoint detected by said viewpoint position detection means, and for controlling an exposure state on the basis of the image signal corresponding to the photometry area;
   mode setting means for setting a plurality of program modes which can be selected in accordance with a photographing condition and are respectively set with control parameters for controlling the exposure state; and
   control means for moving the photometry area so as to track the setting position moved by said exposure control means, said control means restricting a tracking range of the photometry area in accordance with the program mode set by said mode setting means.

8. An apparatus according to claim 7, wherein the control parameters include a parameter for controlling a size of the photometry area.

9. An apparatus according to claim 7, wherein the control parameters include a parameter for controlling a moving range of the photometry area.

10. An apparatus according to claim 7, wherein the control parameters include a parameter for controlling a moving range of the photometry area and limiting movement of the photometry area to an upper portion of an image pickup surface of said image pickup means.

11. An apparatus according to claim 7, further comprising:
    means for setting an image detection area in first detection means for detecting the exposure state of the image area corresponding to the position detected by said viewpoint position detection means, and for setting a range for tracking the image detection area with respect to the selected position as control parameters associated with exposure control which is performed to track the detection signal of the image area corresponding to the position detected by said viewpoint position detection means;
    second detection means for detecting an exposure state of an image area different from said first detection means for detecting the exposure state of the image area corresponding to the position detected by said viewpoint position detection means at one or a plurality of positions; and
    weighting means for multiplying detection signals from said first and second detection means with predetermined weighting coefficients, and wherein said program mode control means changes setting data of the detection area of said second detection means, setting data of the weighting coefficients to be multiplied with the detection signals of said first and second detection means by said weighting means, selecting data of exposure control parameters such as an aperture mechanism, auto-gain control, electronic shutter, and the like in said exposure control means, and setting data of response characteristics of exposure control, in accordance with the program mode.

* * * * *